US008283990B2

(12) United States Patent
Tenno et al.

(10) Patent No.: US 8,283,990 B2
(45) Date of Patent: Oct. 9, 2012

(54) SIGNAL TRANSMISSION COMMUNICATION UNIT AND COUPLER

(75) Inventors: Nobuyuki Tenno, Kyoto-fu (JP); Masanori Tsuji, Kyoto-fu (JP); Hiroshi Mifune, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 13/246,698

(22) Filed: Sep. 27, 2011

(65) Prior Publication Data

US 2012/0013422 A1 Jan. 19, 2012

Related U.S. Application Data

(63) Continuation of application No. PCT/JP2010/055318, filed on Mar. 26, 2010.

(30) Foreign Application Priority Data

Mar. 31, 2009 (JP) ................................ 2009-086718
Dec. 4, 2009 (JP) ................................ 2009-276244
Jan. 26, 2010 (JP) ................................ 2010-014392

(51) Int. Cl.
*H01P 5/02* (2006.01)
*H04B 5/02* (2006.01)

(52) U.S. Cl. .................................... 333/24 R; 455/41.1

(58) Field of Classification Search .................. 333/167, 333/24 C, 24 R; 455/41.1
See application file for complete search history.

(56) References Cited

U.S. PATENT DOCUMENTS 6,624,786 B2 9/2003 Boyle
7,088,307 B2 * 8/2006 Imaizumi ...................... 343/860
7,271,770 B2 * 9/2007 Washiro ........................ 343/702
7,519,328 B2 * 4/2009 Dokai et al. ................ 455/41.2
7,853,208 B2 12/2010 Washiro
7,890,053 B2 2/2011 Washiro
7,894,770 B2 2/2011 Washiro
7,925,235 B2 4/2011 Konya et al.
8,023,890 B2 9/2011 Washiro
2001/0035843 A1 11/2001 Boyle (Continued)

FOREIGN PATENT DOCUMENTS

JP 2003-535542 A 11/2003

(Continued)

OTHER PUBLICATIONS

International Search Report; PCT/JP2010/055318; Jun. 1, 2010.

(Continued)

*Primary Examiner* — Dean O Takaoka

(74) *Attorney, Agent, or Firm* — Studebaker & Brackett PC; Tim L. Brackett, Jr.; John F. Guay

(57) ABSTRACT

This disclosure provides a signal transmission communication unit and a coupler that can occupy a small area and have a reduced thickness. The signal transmission communication unit includes a base component including a signal transmission line and a ground electrode, a coupling planar conductor parallel to the base component and having a planar shape, an inductor circuit connected between the coupling planar conductor and the signal transmission line, and an LC-series circuits between part of the coupling planar conductor and the ground electrode and including a capacitor and an inductor connected in series. The inductor circuit is provided between the coupling planar conductor and the base component, and the LC-series connected circuit is provided between the coupling planar conductor and the base component.

21 Claims, 21 Drawing Sheets

U.S. PATENT DOCUMENTS

| | | | |
|---|---|---|---|
| 2007/0164414 | A1 | 7/2007 | Dokai et al. |
| 2008/0076351 | A1 | 3/2008 | Washiro |

FOREIGN PATENT DOCUMENTS

| | | | |
|---|---|---|---|
| JP | 2008-099234 | A | 4/2008 |
| JP | 2008-099235 | A | 4/2008 |
| JP | 2008-099236 | A | 4/2008 |
| JP | 2008-103902 | A | 5/2008 |
| JP | 2008-103993 | A | 5/2008 |
| JP | 2008-131372 | A | 6/2008 |
| JP | 2008-148345 | A | 6/2008 |
| JP | 2008-154198 | A | 7/2008 |
| JP | 2008-154267 | A | 7/2008 |
| JP | 2008-182714 | A | 8/2008 |
| JP | 2009-027734 | A | 2/2009 |

OTHER PUBLICATIONS

Written Opinion of the International Searching Authority; PCT/JP2010/055318; Jun. 1, 2010.

* cited by examiner

SIGNAL TRANSMISSION COMMUNICATION UNIT AND COUPLER

CROSS REFERENCE TO RELATED APPLICATIONS

The present application is a continuation of International Application No. PCT/JP2010/055318 filed Mar. 26, 2010, which claims priority to Japanese Patent Application Nos. 2010-014392 filed Jan. 26, 2010, 2009-276244 filed Dec. 4, 2009, and 2009-086718 filed Mar. 31, 2009, the entire contents of each of these applications being incorporated herein by reference in their entirety.

TECHNICAL FIELD

The present invention relates to a communication unit performing proximal-state communication for a signal transmission device and a coupler performing a proximal-state coupling operation.

BACKGROUND

Related art of the present disclosure is described in Japanese Unexamined Patent Application Publication No. 2008-154267 (PTL 1). FIG. 1 is a perspective view of a communication unit described in PTL 1. A coupling electrode 108 and a folded stub 103 are formed, respectively, on the upper and lower surfaces of a spacer 109 made of an insulator. The coupling electrode 108 is connected to a central portion of the stub 103 via a through hole (plated through hole) 110 inside the spacer 109. A signal line pattern led out of a transmission/reception circuit module 105 and a conductive pattern 112 connected to a ground conductor 102 via a through hole 106 inside a printed board 101 are formed on the printed board 101. When the spacer 109 is mounted on the printed board 101, ends of the stub 103 are connected to the signal line pattern 111 and the conductive pattern 112.

FIG. 2 is an equivalent circuit diagram of a communication device including two communication units shown in FIG. 1. Inductors L110 each arranged between the transmission/reception circuit module 105 and the coupling electrode 108 are inductors each formed by the through hole 110 shown in FIG. 1. Inductors L103, each of which are connected in shunt between a line to which the inductor L110 is connected and the ground, are inductors each generated by the stub 103 shown in FIG. 1.

SUMMARY

Embodiments of the present disclosure provide a signal transmission communication unit and a coupler that can occupy a smaller area and have reduced thickness.

In one aspect of the disclosure, an embodiment of a signal transmission communication unit includes a base component including a signal transmission line and a ground electrode, a coupling planar conductor parallel to the base component and having a planar shape, an inductor circuit connected between the coupling planar conductor and the signal transmission line, and an LC-series circuit that is connected between part of the coupling planar conductor and the ground electrode and that includes a capacitor and an inductor connected in series. The inductor circuit is provided between the coupling planar conductor and the base component, and the LC-series circuit is provided between the coupling planar conductor and the base component.

In a more specific embodiment, the base component, the coupling planar conductor, the inductor circuit component, and the LC-series circuit component may be arranged in a multi-layer board including a plurality of dielectric layers and a plurality of conductive layers.

In another more specific embodiment, the base component is a mount board on which the coupling planar conductor, the inductor circuit, and the LC-series circuit may be mounted, and a ground electrode including an opening portion arranged in a region facing the coupling planar conductor may be formed in the mount board.

In yet another more specific embodiment, the coupling planar conductor, the inductor circuit, and the LC-series circuit may be arranged, for example, as a module.

In another more specific embodiment, for example, two or more layers may each include the ground electrode, and the size of the opening portion of the ground electrode that is closest to the coupling planar conductor may be the minimum of the sizes of the opening portions of all the ground electrodes.

In another more specific embodiment, the capacitor of the LC-series circuit may include a planar conductor facing in parallel to the coupling planar conductor, the planar conductor may be formed in rotationally symmetrical to the center of the coupling planar conductor, and the inductor circuit may be arranged at a position symmetrical to the center of the planar conductor.

In still another more specific embodiment, the inductor circuit component may include, for example, a spiral conductor twisting along a plane parallel or perpendicular to the base component.

In another more specific embodiment, the LC-series circuit component may include, for example, a spiral conductor twisting along a plane parallel or perpendicular to the base component.

In another more specific embodiment, the LC-series circuit component may include, for example, a plurality of planar conductors that extends in a plane shape parallel to the base component and that generates capacitances in portions where the planar conductors face each other.

In another more specific embodiment, at least one of the inductor circuit component and the LC-series circuit component may be arranged, for example, using a chip component mounted on the base component.

BRIEF DESCRIPTION OF DRAWINGS

FIG. 25A is viewed in the direction of the signal transmission line.

DETAILED DESCRIPTION

Figure 1:
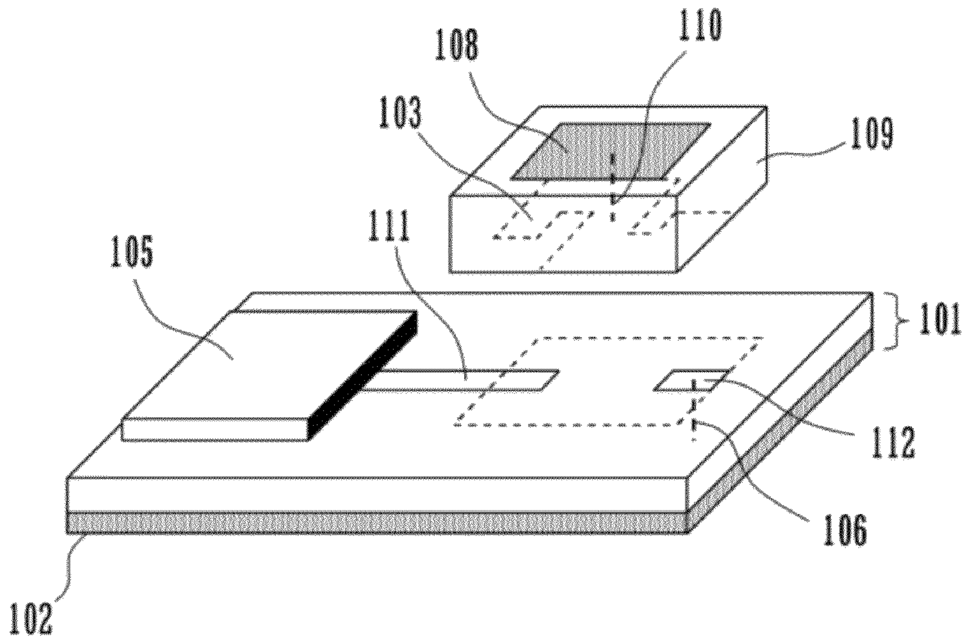
FIG.1 Prior Art
FIG. 1 is a perspective view of a communication unit described in PTL 1.
Figure 2:
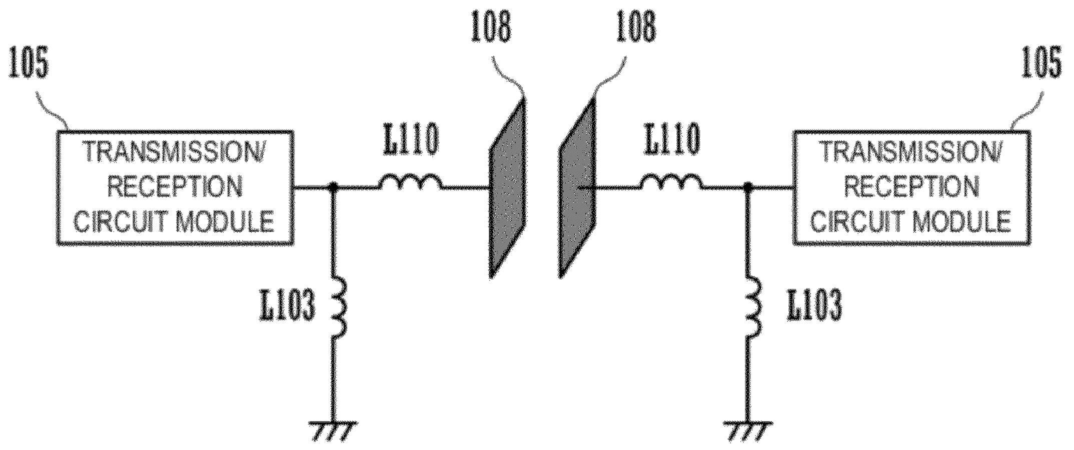
FIG.2 Prior Art
FIG. 2 is an equivalent circuit diagram of a communication device including two communication units shown in FIG. 1.

With respect to the known communication device shown in FIGS. 1 and 2, the inventors realized that it has the following problems: (a) for frequency regulation, there is a need to form a folded stub on a printed board. Consequently, it is necessary for the printed board to have a space for the folded stub; and (b) in order to achieve excellent coupling characteristics in transmission/reception, it is necessary for a through hole (column-shaped conductor), which is connected to a coupling electrode, to have a certain height (length). For example, since a height of 3 mm or more is necessary for a band of 4.5 GHz, it is difficult to reduce the thickness.

The present disclosure provides a signal transmission communication unit and a coupler that can occupy a smaller area and can have a reduced thickness.

A configuration of a signal transmission communication unit 201 according to a first exemplary embodiment will now be explained with reference to FIGS. 3 and 4.

Figure 3A:
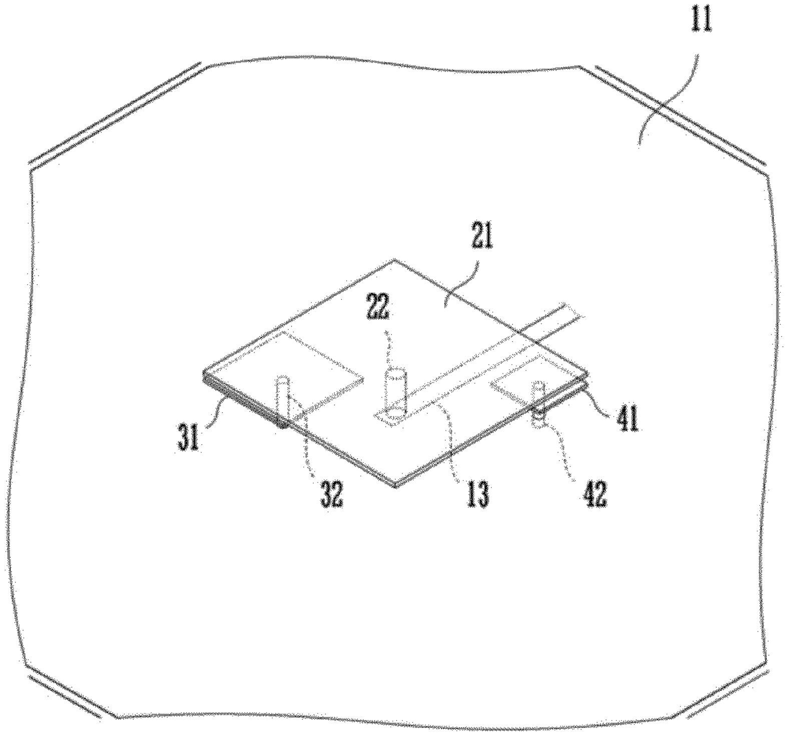
FIG. 3A is a perspective view of a signal transmission communication unit according to a first exemplary embodiment.
Figure 3B:
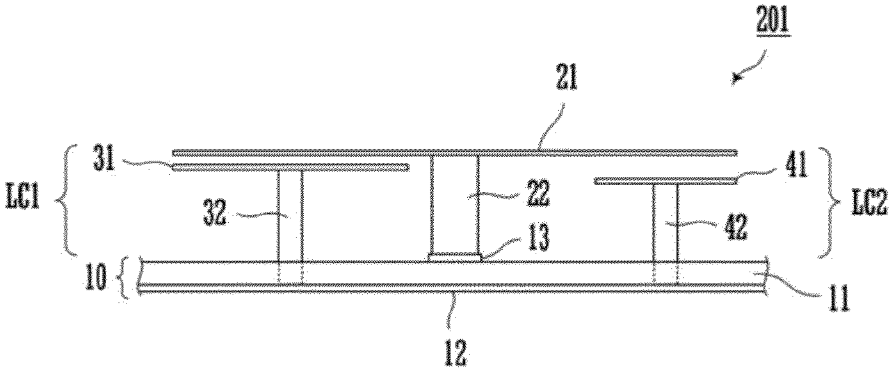
FIG. 3B is a sectional view of a principal portion of the signal transmission communication unit shown in FIG. 3A.

FIG. 3A is a perspective view of the signal transmission communication unit 201. FIG. 3B is a sectional view of a principal portion of the signal transmission communication unit 201. The signal transmission communication unit 201 includes a board 11. A ground electrode 12 is formed on the lower surface of the board 11. A signal transmission line 13 is formed on the upper surface of the board 11. A microstrip line is implemented by the board 11, the ground electrode 12, and the signal transmission line 13. In this example, a layer in which the microstrip line is formed corresponds to a base component 10.

The signal transmission communication unit 201 includes a coupling planar conductor 21, which is parallel to the base component 10 and has a rectangular plate shape. A column-shaped conductor 22 connecting the coupling planar conductor 21 and the signal transmission line 13 is arranged between the coupling planar conductor 21 and the base component 10. An inductor circuit is implemented by the column-shaped conductor 22.

LC-series circuits LC1 and LC2, which are connected between part of the coupling planar conductor 21 and the ground electrode 12, are arranged between the coupling planar conductor 21 and the base component 10. Namely, planar conductors 31 and 41 each facing part of the coupling planar conductor 21 with a certain space therebetween and column-shaped conductors 32 and 42 connecting the planar conductors 31 and 41 and the ground electrode 12 are arranged.

Figure 4:
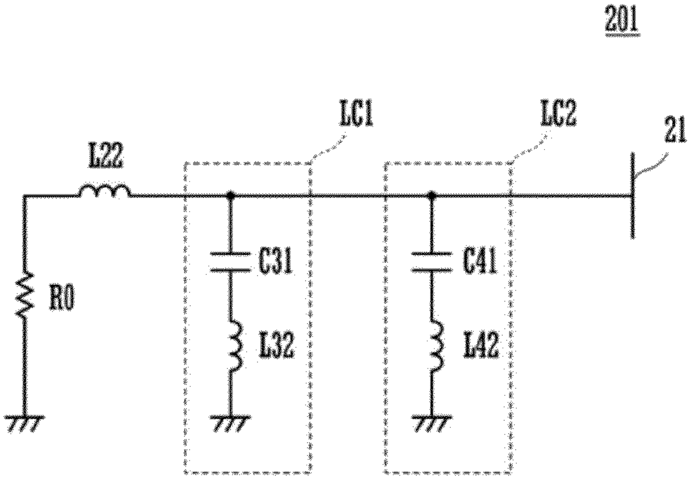
FIG. 4 is an equivalent circuit diagram of the signal transmission communication unit shown in FIG. 3.

FIG. 4 is an equivalent circuit diagram of the signal transmission communication unit 201 shown in FIG. 3. In FIG. 4, a resistor R0 represents a resistor corresponding to the characteristic impedance of the microstrip line. In addition, in FIG. 4, an inductor L22 represents an inductor corresponding to the column-shaped conductor 22 shown in FIG. 3. A capacitor C31 represents a capacitor implemented by the planar conductor 31 and the coupling planar conductor 21. An inductor L32 represents an inductor implemented by the column-shaped conductor 32. Similarly, an inductor L42 represents an inductor implemented by the column-shaped conductor 42. A capacitor C41 represents a capacitor implemented by the planar conductor 41 and the coupling planar conductor 21.

As described above, a circuit is arranged in which the two LC-series circuits LC1 and LC2 are connected in shunt to a line to which the inductor L22 and the coupling planar conductor 21 are connected. Thus, each of the LC-series circuits LC1 and LC2 operates as a trap filter.

Specific examples of dimensions of the components shown in FIG. 3 are provided below.

[Coupling Planar Conductor 21]

12 mm×12 mm

[Planar Conductor 31]

5.0 mm×5.0 mm

[Planar Conductor 41]

3.0 mm×3.0 mm

[Column-Shaped Conductor 22]

3.0 mm in height

[Column-Shaped Conductor 32]

2.8 mm in height

[Column-Shaped Conductor 42]

2.5 mm in height

The capacitor C31 shown in FIG. 4 is defined in accordance with the area in which the planar conductor 31 faces the coupling planar conductor 21, the space between the planar conductor 31 and the coupling planar conductor 21, and the relative dielectric constant of the facing portion. Thus, the capacitance can be defined in accordance with such settings. Similarly, the capacitor C41 is defined in accordance with the area in which the planar conductor 41 faces the coupling planar conductor 21, the space between the planar conductor 41 and the coupling planar conductor 21, and the relative dielectric constant of the facing portion. Thus, the capacitance can be defined in accordance with such settings.

In addition, since the inductor L32 shown in FIG. 4 is defined in accordance with the height and diameter of the column-shaped conductor 32 shown in FIG. 3, the inductance can be defined in accordance with such settings. Similarly, since the inductor L42 is defined in accordance with the height and diameter of the column-shaped conductor 42, the inductance can be defined in accordance with such settings.

The series resonant frequencies of the LC-series circuits LC1 and LC2 can be set in a wide range by using many parameters, as described above.

Accordingly, providing two trap circuits having different resonant frequencies on the signal transmission line causes the two resonant frequencies to serve as attenuation poles. Thus, a signal transmission communication unit that can use a frequency band arranged between the two attenuation poles can be arranged.

Figure 5A:
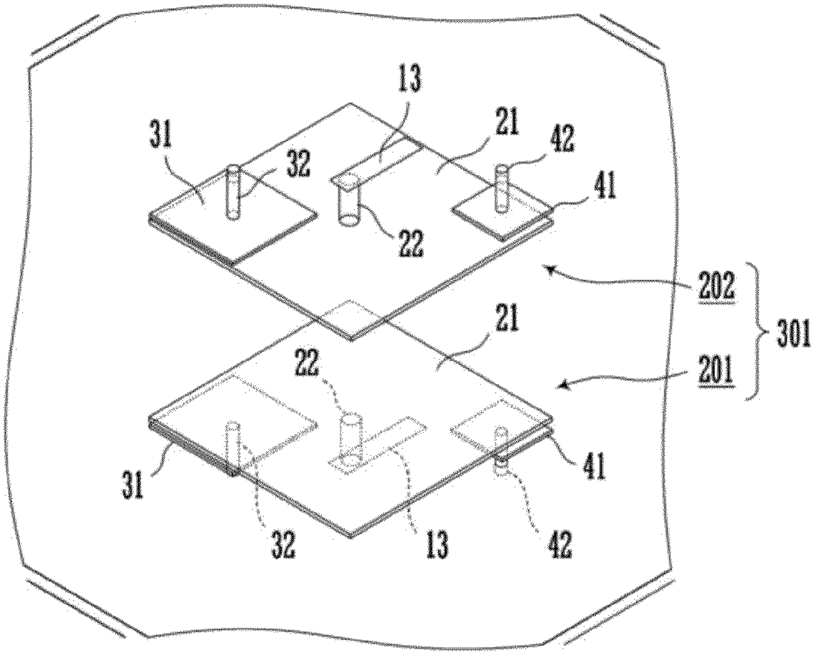
FIG. 5A is a perspective view of a principal portion of a coupler according to a second exemplary embodiment.
Figure 5B:
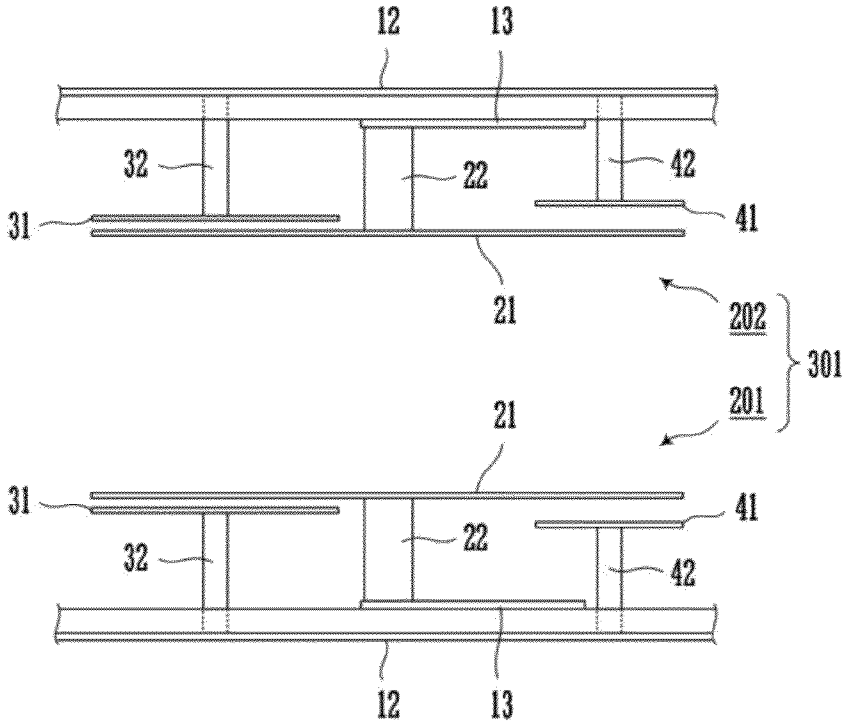
FIG. 5B is a sectional view of the principal portion of the coupler shown in FIG. 5A.

FIG. 5A is a perspective view of a coupler 301 according to a second exemplary embodiment. FIG. 5B is a sectional view of a principal portion of the coupler 301. The coupler 301 includes a first signal transmission communication unit 201 and a second signal transmission communication unit 202. The first signal transmission communication unit 201 is the same as the signal transmission communication unit 201 shown in FIG. 3 in the first exemplary embodiment. In terms of configuration, the second signal transmission communication unit 202 is the same as the first signal transmission communication unit 201. The coupler 301 is implemented by arranging the signal transmission communication units 201 and 202 in such a manner that the coupling planar conductors 21 are opposed to (face) each other.

An insulating or dielectric layer may be formed on a surface of each of the coupling planar conductors 21. Even with this configuration, a certain capacitance is generated between the coupling planar conductors 21 facing each other.

Figure 6:
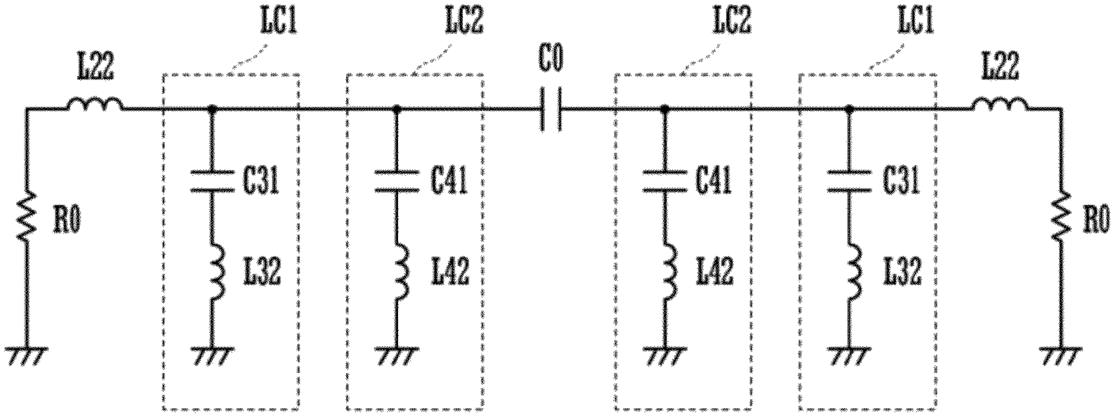
FIG. 6 is an equivalent circuit diagram of the coupler shown in FIGS. 5A and 5B.

FIG. 6 is an equivalent circuit diagram of the coupler 301 shown in FIG. 5. In FIG. 6, a capacitor C0 represents a capacitor implemented by the coupling planar conductor 21 of the first signal transmission communication unit 201 and the coupling planar conductor 21 of the second signal transmission communication unit 202 shown in FIG. 5.

Figure 7A:
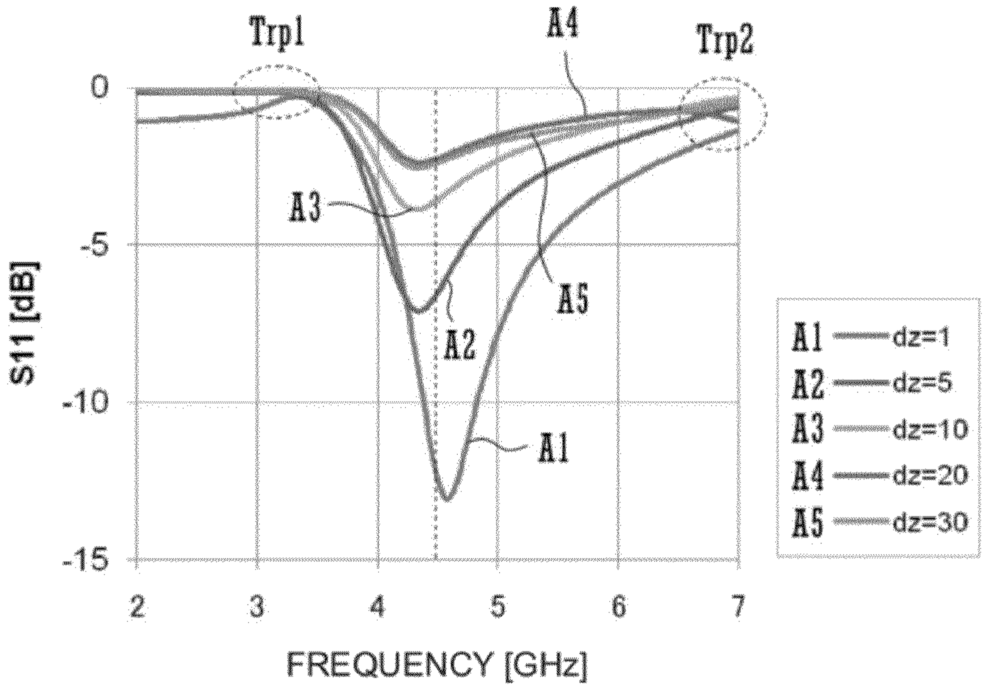
FIG. 7A is a graph showing the frequency characteristics of reflection characteristics when the coupler shown in FIG. 5 is viewed from a microstrip line of the first signal transmission communication unit.
Figure 7B:
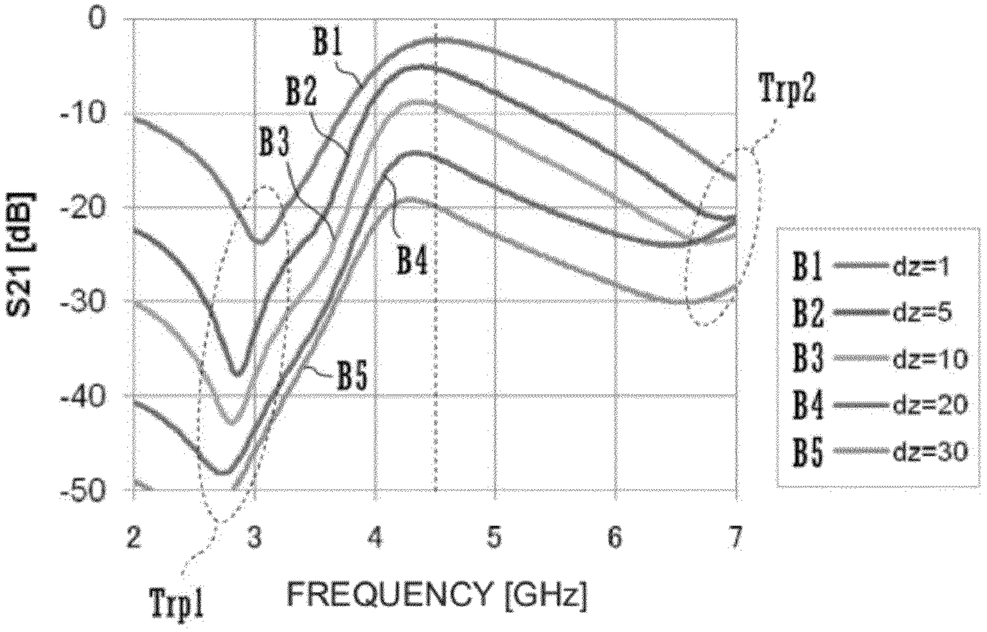
FIG. 7B is a graph showing the frequency characteristics of transmission characteristics from the microstrip line of the first signal transmission communication unit to a microstrip line of a second signal transmission communication unit.

FIG. 7A is a graph showing the frequency characteristics of reflection characteristics (S11 of an S parameter) when the coupler 301 is viewed from a microstrip line of the first signal transmission communication unit 201. FIG. 7B is a graph showing the frequency characteristics of transmission characteristics (S21 of an S parameter) from the microstrip line of the first signal transmission communication unit 201 to a microstrip line of the second signal transmission communication unit 202. In both graphs, the size (mm) of the space dz between the coupling planar conductors 21 facing each other serves as a parameter.

In FIGS. 7A and 7B, a frequency band Trp1 corresponds to the resonant frequency of LC-series circuits LC1 shown in FIG. 6. Similarly, a frequency band Trp2 corresponds to the resonant frequency of LC-series circuits LC2. In this example, a frequency of 4.5 GHz, which is between the two trap frequencies, serves as the designed center frequency of a frequency band for communication. As is clear from this example, even when the space dz varies in a range between 1 mm and 30 mm, a low reflection characteristic and a low insertion loss characteristic can be attained at approximately 4.5 GHz.

A variation in the trap frequency according to the value of the space dz is caused by a variation in the capacitance formed between the coupling planar conductors 21 facing each other.

As described above, by appropriately setting a lower trap frequency and a higher trap frequency in accordance with a frequency band to be used for communication, optimal reflection characteristics and optimal transmission characteristics can be achieved.

Figure 8A:
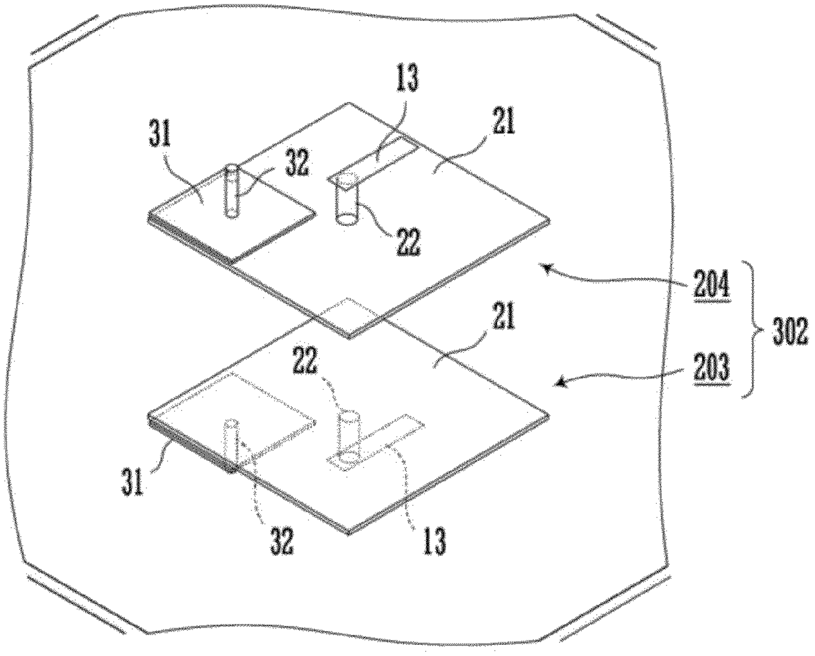
FIG. 8A is a perspective view of a principal portion of a coupler according to a third exemplary embodiment.
Figure 8B:
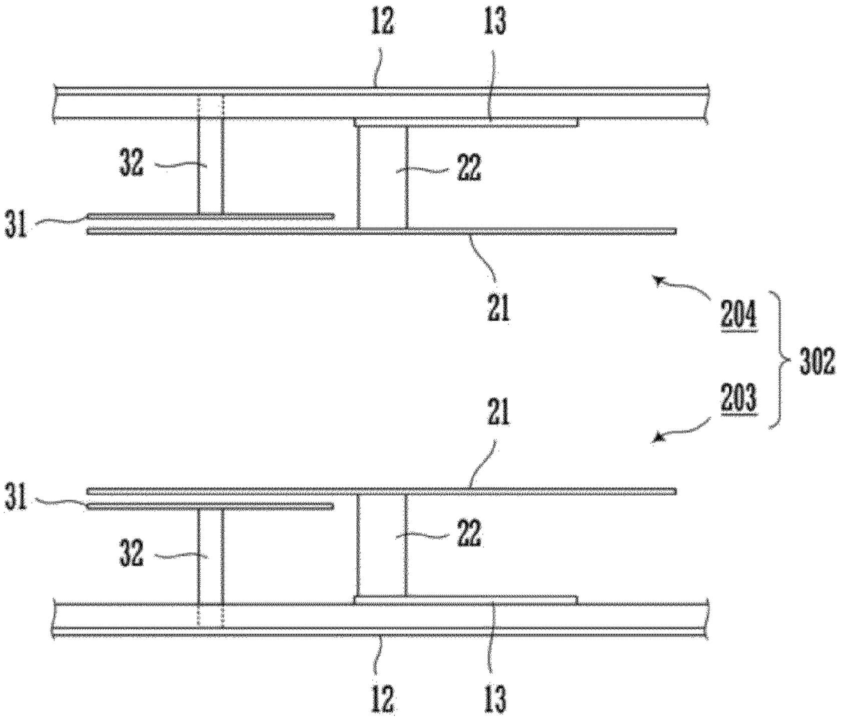
FIG. 8B is a sectional view of the principal portion of the coupler shown in FIG. 8A.

FIG. 8A is a perspective view of a principal portion of a coupler 302 according to a third exemplary embodiment. FIG. 8B is a sectional view of the principal portion of the coupler 302. The coupler 302 includes a first signal transmission communication unit 203 and a second signal transmission communication unit 204.

The first signal transmission communication unit 203 and the second signal transmission communication unit 204 each has a configuration not including the planar conductor 41 and the column-shaped conductor 42 of the signal transmission communication unit 201 shown in FIG. 3 in the first exemplary embodiment.

Figure 9:
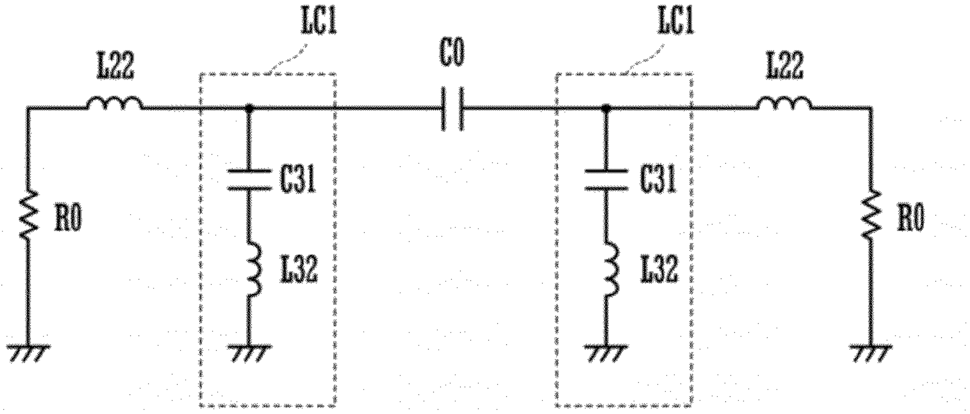
FIG. 9 is an equivalent circuit diagram of the coupler shown in FIGS. 8A and 8B.

FIG. 9 is an equivalent circuit diagram of the coupler 302 shown in FIG. 8. In FIG. 9, a capacitor C0 represents a capacitor implemented by a coupling planar conductor 21 of the first signal transmission communication unit 203 and a coupling planar conductor 21 of the second signal transmission communication unit 204 shown in FIG. 8.

Figure 10A:
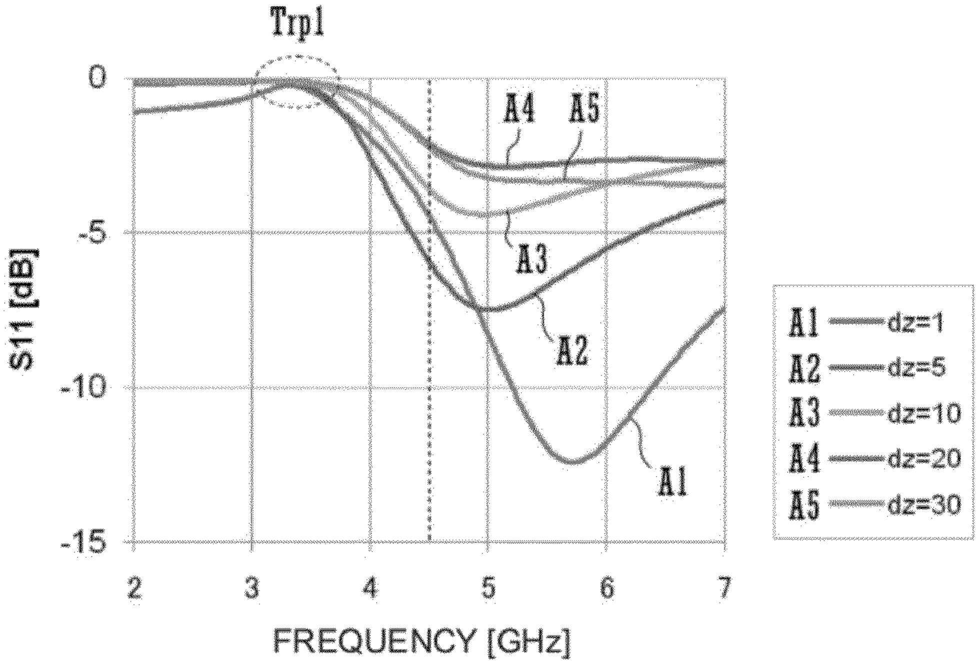
FIG. 10A is a graph showing the frequency characteristics of reflection characteristics (S11 of an S parameter) when the coupler shown in FIGS. 8A and 8B is viewed from a microstrip line of a first signal transmission communication unit.
Figure 10B:
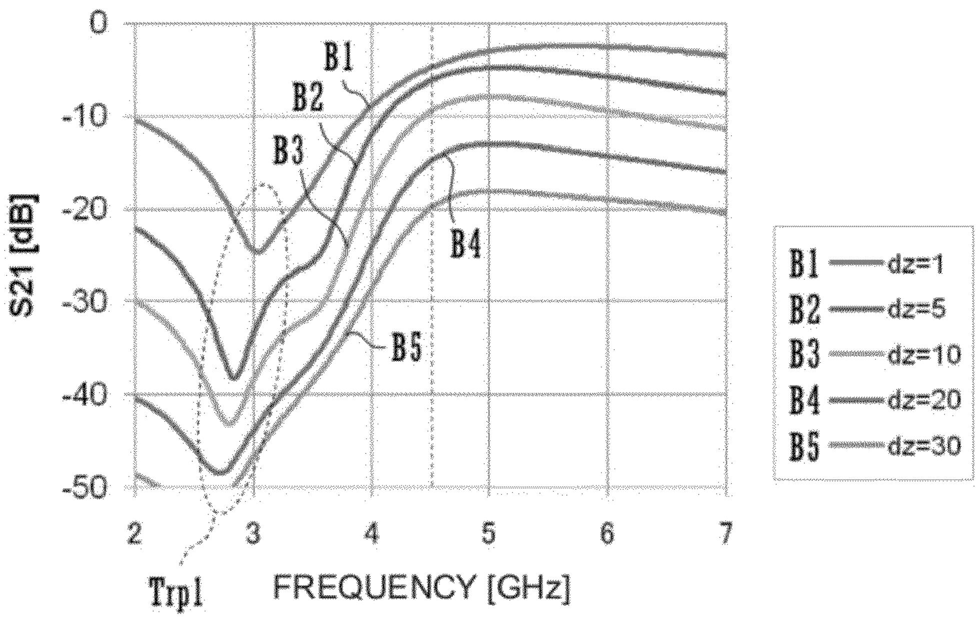
FIG. 10B is a graph showing the frequency characteristics of transmission characteristics from the microstrip line of the first signal transmission communication unit to a microstrip line of a second signal transmission communication unit.

FIG. 10A is a graph showing the frequency characteristics of reflection characteristics (S11 of an S parameter) when the coupler 302 is viewed from a microstrip line of the first signal transmission communication unit 203. FIG. 10B is a graph showing the frequency characteristics of transmission characteristics (S21 of an S parameter) from the microstrip line of the first signal transmission communication unit 203 to a microstrip line of the second signal transmission communication unit 204. In both graphs, the size (mm) of the space dz between the coupling planar conductors 21 facing each other serves as a parameter.

In FIGS. 10A and 10B, a frequency band Trp1 corresponds to the resonant frequency of LC-series circuits LC1 shown in FIG. 9. In this example, a frequency of 4.5 GHz serves as the designed center frequency of a frequency band for communication. As is clear from this example, even when the space dz varies in a range between 1 mm and 30 mm, a low reflection characteristic and a low insertion loss characteristic can be attained at approximately 4.5 GHz.

As described above, by appropriately setting a lower trap frequency in accordance with a frequency band to be used for communication, optimal reflection characteristics and optimal transmission characteristics can be achieved.

Similarly, by appropriately setting a higher trap frequency in accordance with a frequency band to be used for communication, optimal reflection characteristics and optimal transmission characteristics may be achieved.

Figure 11A:
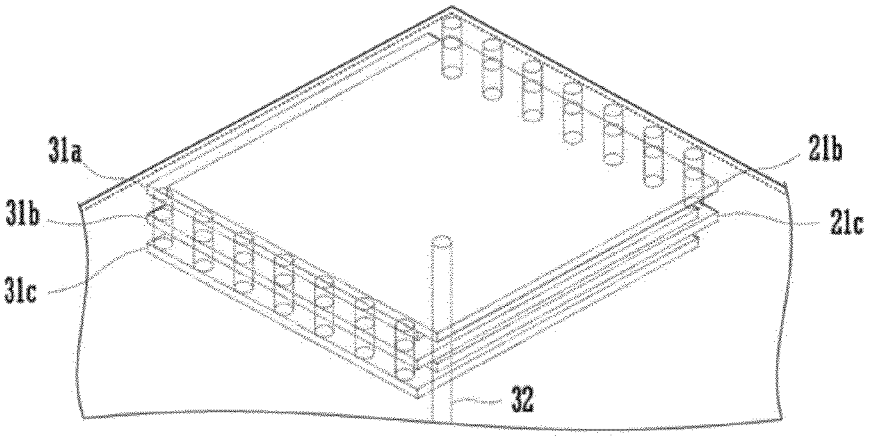
FIG. 11A is a partial perspective view of a coupler according to a fourth exemplary embodiment.
Figure 11B:
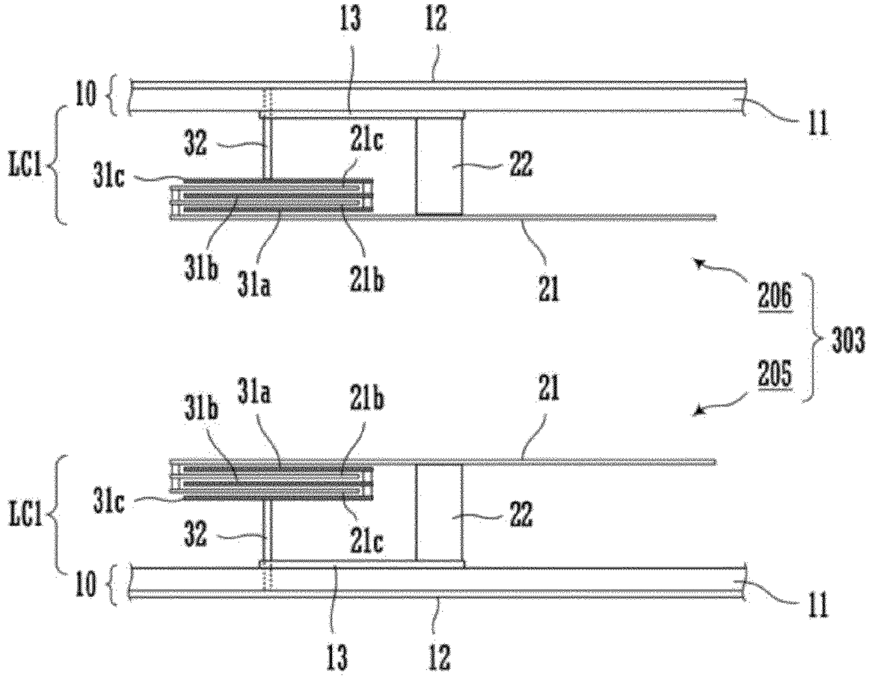
FIG. 11B is a sectional view of a principal portion of the coupler shown in FIG. 11A.

FIG. 11A is a partial perspective view of a coupler 303 according to a fourth exemplary embodiment. FIG. 11B is a sectional view of a principal portion of the coupler 303. The coupler 303 includes a first signal transmission communication unit 205 and a second signal transmission communication unit 206.

The coupler 303 is implemented by arranging the signal transmission communication units 205 and 206 in such a manner that the coupling planar conductor 21 of the first signal transmission communication unit 205 and the coupling planar conductor 21 of the second signal transmission communication unit 206 are opposed to (face) each other.

The signal transmission communication unit 205 includes a board 11. A ground electrode 12 is formed on the lower surface of the board 11. A signal transmission line 13 is formed on the upper surface of the board 11. A microstrip line is implemented by the board 11, the ground electrode 12, and the signal transmission line 13. A layer in which the microstrip line is formed corresponds to a base component 10.

The signal transmission communication unit 205 includes the coupling planar conductor 21, which is parallel to the base component 10 and has a rectangular plate shape. A column-shaped conductor 22 connecting the coupling planar conductor 21 and the signal transmission line 13 is arranged between the coupling planar conductor 21 and the base component 10. An inductor circuit is implemented by the column-shaped conductor 22.

An LC-series circuit LC1, which is connected between part of the coupling planar conductor 21 and the ground electrode 12, is arranged between the coupling planar conductor 21 and the base component 10. Namely, the coupling planar conductor 21, capacitor planar conductors 21*b* and 21*c*, and capacitor planar conductors 31*a*, 31*b*, and 31*c* are arranged in an alternating manner, thus generating capacitances between adjacent capacitor planar conductors. Accordingly, with part of the coupling planar conductor 21 and the capacitor planar conductors 21*b*, 21*c*, 31*a*, 31*b*, and 31*c*, a capacitor having a relatively large capacitance can be attained in a limited area. The LC-series circuit LC1 is implemented by this capacitor and the column-shaped conductor 32.

The configuration of the signal transmission communication unit 206 is similar to the configuration of the signal transmission communication unit 205.

Figure 12A:
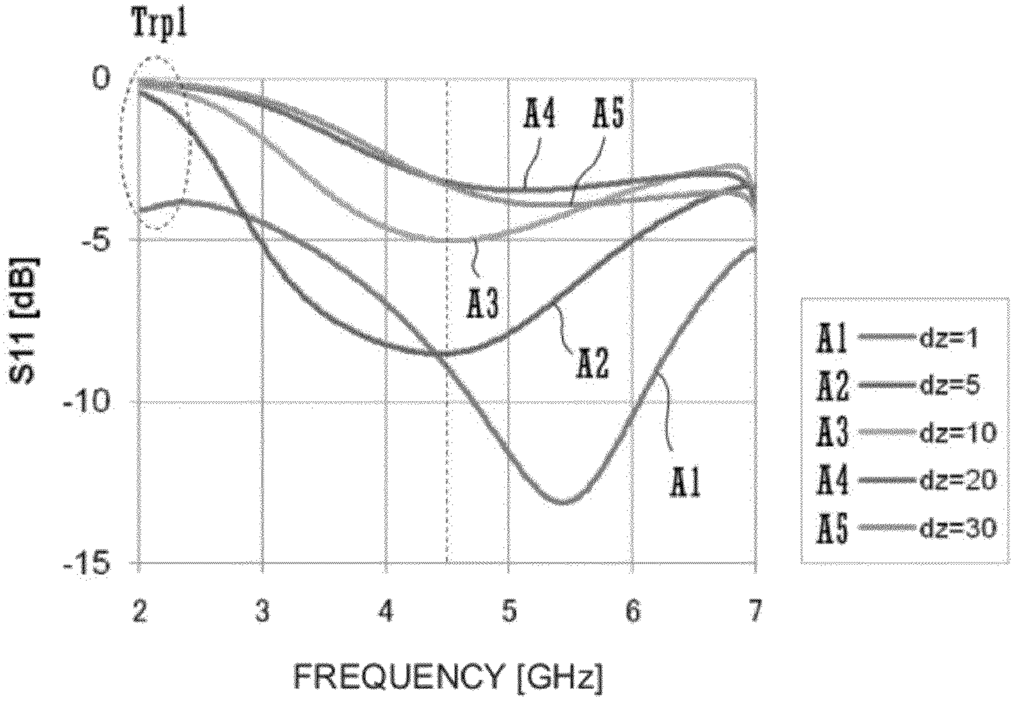
FIG. 12A is a graph showing the frequency characteristics of reflection characteristics (S11 of an S parameter) when the coupler shown in FIGS. 11A and 11B is viewed from a microstrip line of a first signal transmission communication unit.
Figure 12B:
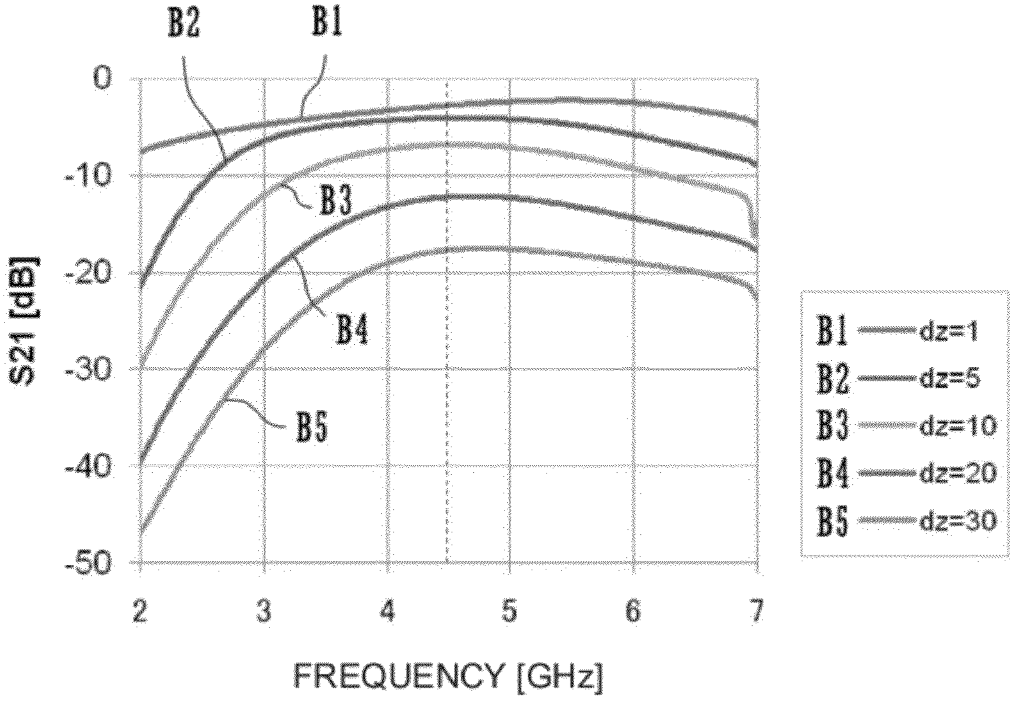
FIG. 12B is a graph showing the frequency characteristics of transmission characteristics from the microstrip line of the first signal transmission communication unit to a microstrip line of a second signal transmission communication unit.

FIG. 12A is a graph showing the frequency characteristics of reflection characteristics (S11 of an S parameter) when the coupler 303 is viewed from a microstrip line of the first signal transmission communication unit 205. FIG. 12B is a graph showing the frequency characteristics of transmission characteristics (S21 of an S parameter) from the microstrip line of the first signal transmission communication unit 205 to a microstrip line of the second signal transmission communication unit 206. In both graphs, the size (mm) of the space dz between the coupling planar conductors 21 facing each other serves as a parameter.

In FIGS. 12A and 12B, a frequency band Trp1 corresponds to the resonant frequency of the LC-series circuits LC1 shown in FIG. 11. In this example, a frequency of 4.5 GHz serves as the designed center frequency of a frequency band for communication. As is clear from this example, even when the space dz varies in a range between 1 mm and 30 mm, a low reflection characteristic and a low insertion loss characteristic can be attained at approximately 4.5 GHz.

As described above, by appropriately setting a lower trap frequency in accordance with a frequency band to be used for communication, optimal reflection characteristics and optimal transmission characteristics can be achieved.

Figure 13A:
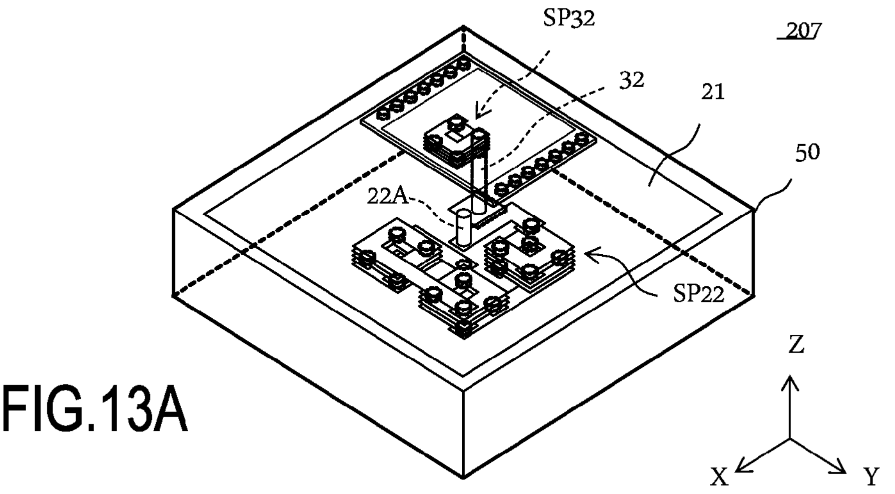
FIG. 13A is a perspective view of a signal transmission communication unit according to a fifth exemplary embodiment.
Figure 13B:
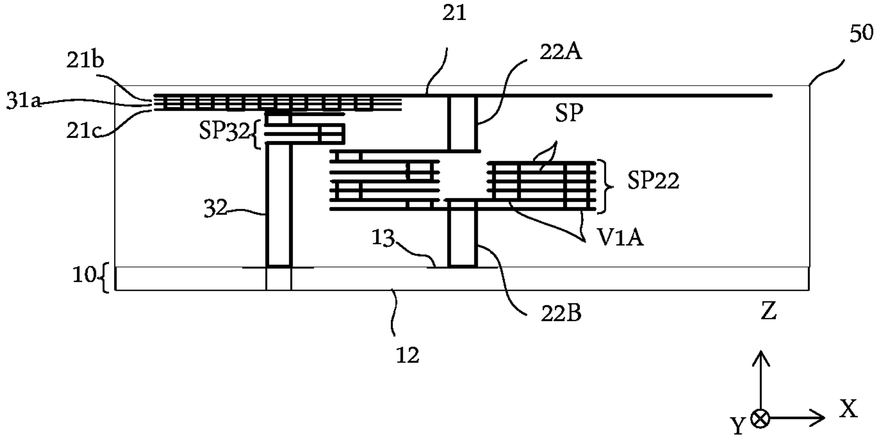
FIG. 13B is a perspective diagram viewed in the Y-axis direction from the X-Z plane in FIG. 13A.
Figure 13C:
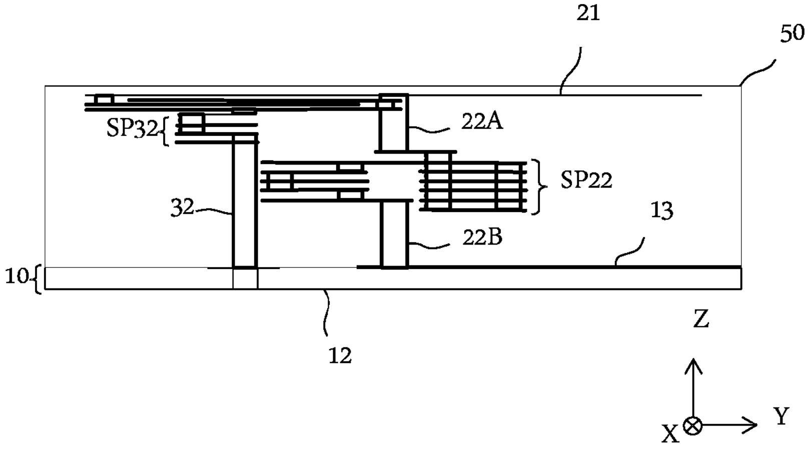
FIG. 13C is a perspective diagram viewed in the −X-axis direction from the Y-Z plane in FIG. 13A.

FIG. 13A is a perspective view of a signal transmission communication unit 208 according to a fifth exemplary embodiment. FIG. 13B is a perspective diagram obtained when the Y-axis direction is viewed from the X-Z plane in FIG. 13A. FIG. 13C is a perspective diagram obtained when the −X-axis direction is viewed from the Y-Z plane in FIG. 13A.

The signal transmission communication unit 208 according to the fifth exemplary embodiment is formed of a multi-layer board 50 including a plurality of dielectric layers and a plurality of conductive layers. A ground electrode 12 is formed on the lower surface of the multi-layer board 50. A signal transmission line 13 is formed inside the multi-layer board 50. A microstrip line is implemented by the signal transmission line 13, the ground electrode 12, and the dielectric layers between the signal transmission line 13 and the ground electrode 12.

A coupling planar conductor 21 having a rectangular plate shape is formed inside the multi-layer board 50. A column-shaped conductor 22A whose first end portion is in contact with substantially the center of the coupling planar conductor 21 and a column-shaped conductor 22B whose first end portion is electrically connected to the signal transmission line 13 are also formed inside the multi-layer board 50. A spiral inductor SP22 is formed between a second end portion of the column-shaped conductor 22A and a second end portion of the column-shaped conductor 22B. With conductive layers parallel to the base component 10 and via holes perpendicular to the base component 10, the spiral inductor SP22 is arranged using a plurality of spiral conductive patterns twisting along the plane parallel to the base component 10.

A capacitor is arranged, inside the multi-layer board 50, using part of the coupling planar conductor 21, the capacitor planar conductors 21*b* and 21*c*, and the capacitor planar conductors 31*a*.

A column-shaped conductor 32 whose first end portion is electrically connected to the ground electrode 12 is formed inside the multi-layer board 50. A spiral inductor SP32 is formed between a second end portion of the column-shaped conductor 32 and the capacitor planar conductor 21*c*. With conductive layers parallel to the base component 10 and via holes perpendicular to the base component 10, the spiral inductor SP32 is arranged using spiral conductive patterns twisting along the plane parallel to the base component 10.

The size of the multi-layer board 50 is, for example, 3.5 mm to 4.5 mm×3.5 mm to 4.5 mm×0.95 mm. The relative dielectric constant is, for example, 6.0.

As described above, the signal transmission communication unit 208 is implemented by arranging the base component 10, the coupling planar conductor 21, the inductor circuit, and the LC-series circuit, inside the multi-layer board 50. The equivalent circuit of the signal transmission communication unit 208 is similar to the equivalent circuit of one of the signal transmission communication units of the coupler 302 shown in FIG. 9 in the third exemplary embodiment.

According to the fifth exemplary embodiment, since inductors are implemented by spiral conductive patterns, the inductance component per unit volume increases. Thus, the thickness of the whole signal transmission communication unit 207 can be reduced. In addition, with a wavelength shortening effect due to the dielectric constant of the multi-layer board 50, the area of the signal transmission communication unit 207 can be reduced. Furthermore, since fabrication using a multi-layer board method can be used, mass manufacturing can be easily achieved.

Two or more LC-series circuits may be arranged inside the multi-layer board 50.

Figure 14A:
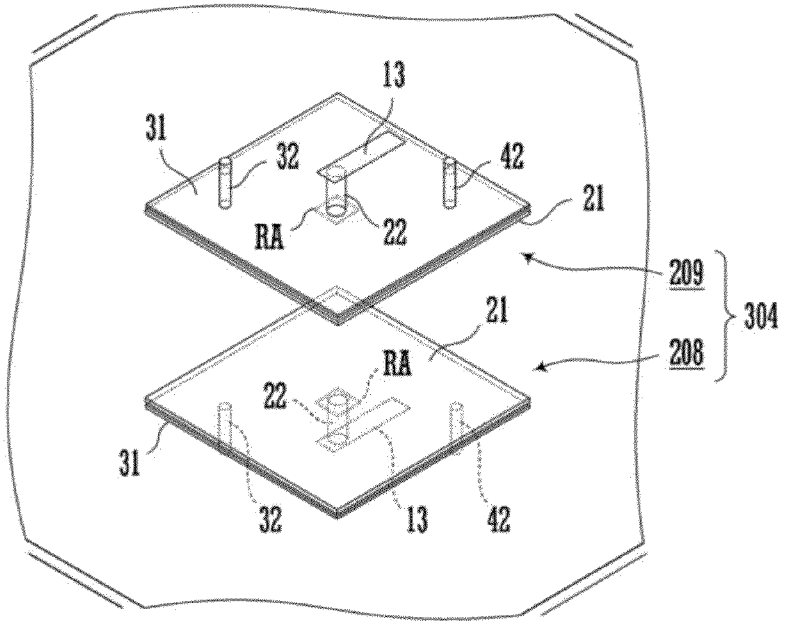
FIG. 14A is a perspective view of a principal portion of a coupler according to a sixth exemplary embodiment.
Figure 14B:
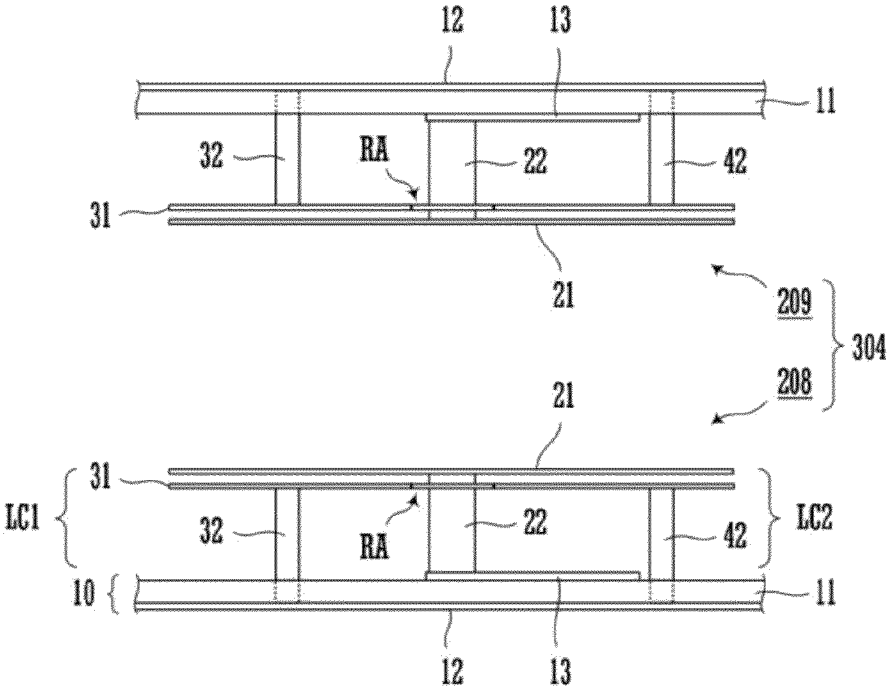
FIG. 14B is a sectional view of the principal portion of the coupler shown in FIG. 14A.

FIG. 14A is a perspective view of a principal portion of a coupler 304 according to a sixth exemplary embodiment. FIG. 14B is a sectional view of the principal portion of the coupler 304. The coupler 304 includes a first signal transmission communication unit 208 and a second signal transmission communication unit 209.

The first signal transmission communication unit 208 includes a board 11. A ground electrode 12 is formed on the lower surface of the board 11 and a signal transmission line 13 is formed on the upper surface of the board 11. A microstrip line is implemented, in the base component 10, by the board 11, the ground electrode 12, and the signal transmission line 13.

The first signal transmission communication unit 208 includes a coupling planar conductor 21, which is parallel to the base component 10 and has a rectangular plate shape. The first signal transmission communication unit 208 also includes a planar conductor 31 facing the coupling planar conductor 21 with a certain space therebetween. A rectangular opening RA is formed at the center of the planar conductor 31. The planar conductor 31 is arranged to be rotationally symmetrical to the center of the coupling planar conductor 21.

A column-shaped conductor 22 connecting the coupling planar conductor 21 and the signal transmission line 13 is arranged between the coupling planar conductor 21 and the base component 10. The column-shaped conductor 22 penetrates through the opening RA of the planar conductor 31 and is not electrically connected to the planar conductor 31. An inductor circuit is implemented by the column-shaped conductor 22. The inductor circuit is arranged at a position symmetrical to the center of the planar conductor 31.

LC-series circuits LC1 and LC2, which are connected between part of the coupling planar conductor 21 and the ground electrode 12, are arranged between the coupling planar conductor 21 and the base component 10. Namely, the planar conductor 31 that faces part of the coupling planar conductor 21 with a certain space therebetween and column-shaped conductors 32 and 42 connecting the planar conductor 31 and the ground electrode 12 are arranged.

In terms of configuration, the second signal transmission communication unit 209 is the same as the first signal transmission communication unit 208. The coupler 304 is implemented by arranging the signal transmission communication units 208 and 209 in such a manner that the coupling planar conductors 21 are opposed to (face) each other.

Specific examples of dimensions of the components shown in FIG. 14 are provided below.

Figure 15:
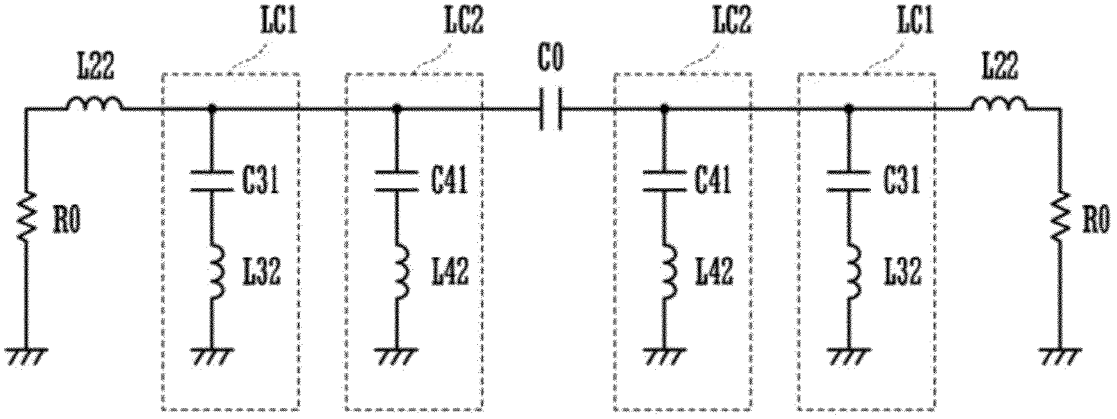
FIG. 15 is an equivalent circuit diagram of the coupler shown in FIG. 14.

[Coupling Planar Conductor 21]
15 mm×15 mm
[Planar Conductor 31]
15 mm×15 mm
[Opening RA]
2.0 mm×2.0 mm
[Column-Shaped Conductor 22]
3.0 mm in height
[Column-Shaped Conductor 32]
2.8 mm in height
[Column-Shaped Conductor 42]
2.8 mm in height FIG. 15 is an equivalent circuit diagram of the coupler 304 shown in FIG. 14. In FIG. 15, a resistor R0 represents a resistor corresponding to the characteristic impedance of the microstrip line. In FIG. 15, an inductor L22 represents an inductor corresponding to the column-shaped conductor 22 shown in FIG. 3. A capacitor C31 represents a capacitor implemented by a portion of the planar conductor 31 that is near the column-shaped conductor 32 and the coupling planar conductor 21. A capacitor C41 represents a capacitor implemented by a portion of the planar conductor 31 that is near the column-shaped conductor 42 and the coupling planar conductor 21. An inductor L32 represents an inductor implemented by the column-shaped conductor 32 and an inductor L42 represents an inductor implemented by the column-shaped conductor 42.

As described above, circuits in which LC-series circuits LC12 are connected in shunt to a line to which the inductor L22 and the coupling planar conductor 21 are connected are arranged. Thus, the LC-series circuits LC12 operate as trap filters. A first trap filter is implemented by the capacitor C31 and the inductor L32. A second trap filter is implemented by the capacitor C41 and the inductor L42.

In FIG. 15, a capacitor C0 represents a capacitor implemented by the coupling planar conductor 21 of the first signal transmission communication unit 208 and the coupling planar conductor 21 of the second signal transmission communication unit 209 shown in FIG. 14.

FIGS. 16 and 17 are diagrams used for comparing the characteristics of the coupler according to the sixth exemplary embodiment with the characteristics of the coupler according to the third exemplary embodiment.

Figure 16A:
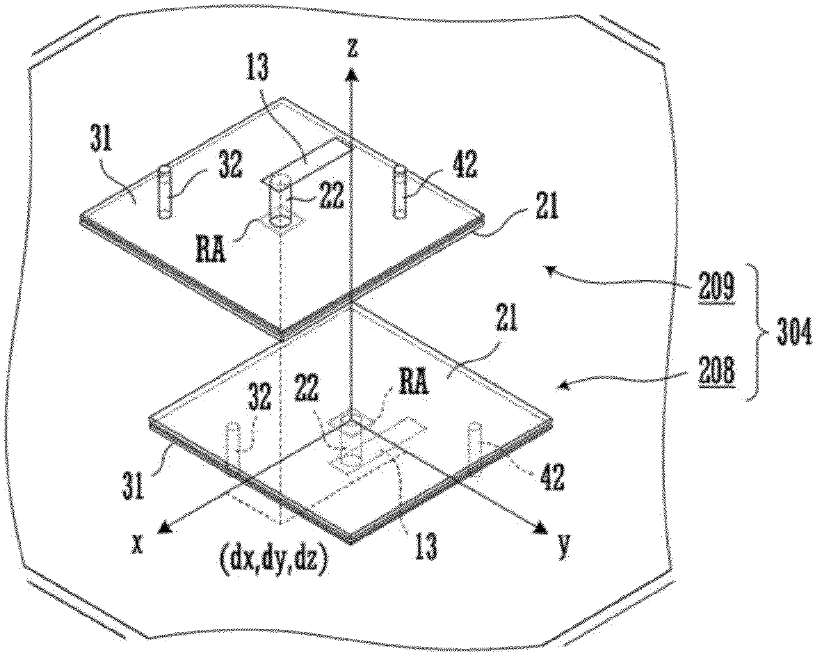
FIG. 16A is a diagram showing the amount of positional shift of a second signal transmission communication unit with respect to a first signal transmission communication unit in the coupler according to the sixth exemplary embodiment.
Figure 16B:
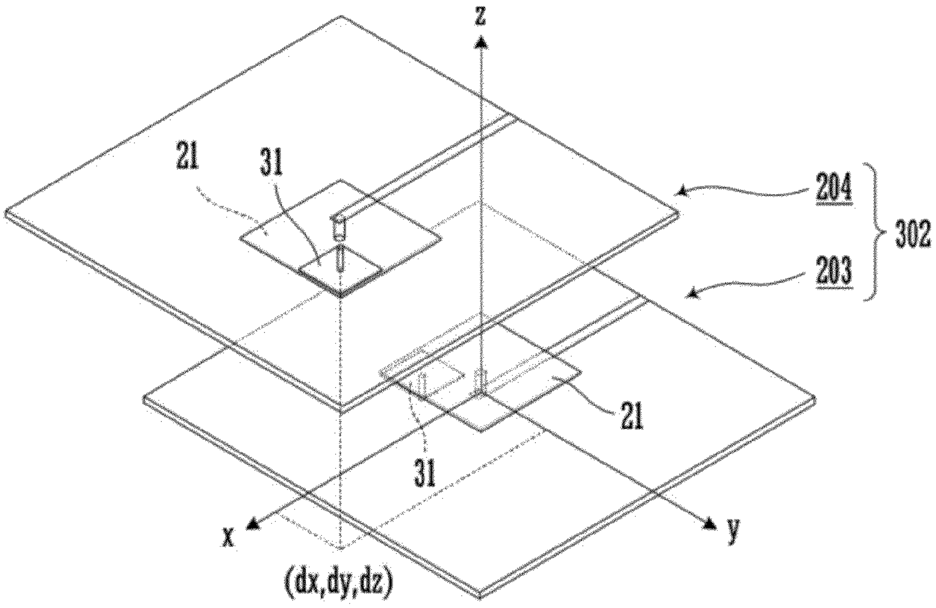
FIG. 16B is a diagram showing the amount of positional shift of the second signal transmission communication unit with respect to the first signal transmission communication unit in the coupler according to the third exemplary embodiment.

FIG. 16A is a diagram showing the amount of positional shift of the second signal transmission communication unit 209 with respect to the first signal transmission communication unit 208 in the coupler 304 according to the sixth exemplary embodiment. FIG. 16B is a diagram showing the amount of positional shift of the second signal transmission communication unit 204 with respect to the first signal transmission communication unit 203 in the coupler 302 according to the third exemplary embodiment.

Each of the first signal transmission communication unit 208 and the second signal transmission communication unit 209 is parallel to the x-y plane. The amount of positional shift in the in-plane direction on the x-y plane is represented by (dx, dy, dz).

Figure 17A:
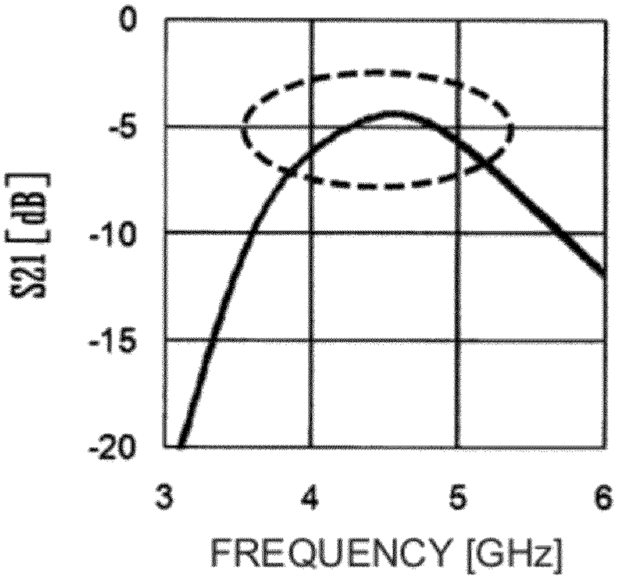
FIGS. 17A and 17B are graphs showing how the frequency characteristics of transmission characteristics (S21 of an S parameter) vary in accordance with the positional shift amount (dx, dy, dz).
Figure 17B:
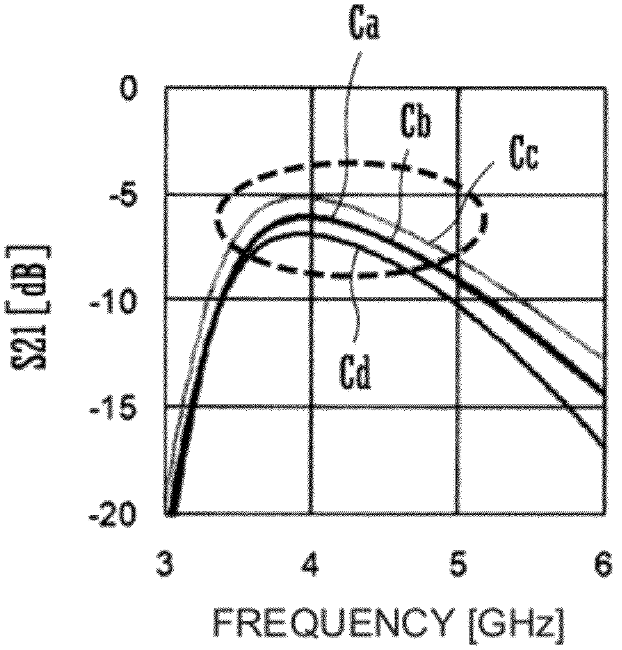

FIGS. 17A and 17B are graphs showing how the frequency characteristics of transmission characteristics (S21 of an S parameter) vary in accordance with the positional shift amount (dx, dy, dz). Here, the four types of positional shift are taken as examples:

[a] (dx, dy, dz)=(−10 mm, 0 mm, 10 mm)
[b] (dx, dy, dz)=(10 mm, 0 mm, 10 mm)
[c] (dx, dy, dz)=(0 mm, −10 mm, 10 mm)
[d] (dx, dy, dz)=(0 mm, 10 mm, 10 mm)

In FIG. 17B, curves Ca, Cb, Cc, and Cd represent the characteristics of the types of positional shift [a], [b], [c], and [d]. Also in FIG. 17A, the characteristics of the types of positional shift [a], [b], [c], and [d] are plotted, where all the curves are superposed.

In the coupler 302 according to the third exemplary embodiment, the transmission characteristics vary in accordance with the positional shift amount (dx, dy, dz) in the in-plane direction, as shown in FIG. 17B. In contrast, in the coupler 304 according to the sixth exemplary embodiment, a shift of about 10 mm on the x-y plane does not cause a change in the characteristics, as is clear from FIG. 17A.

Figure 18A:
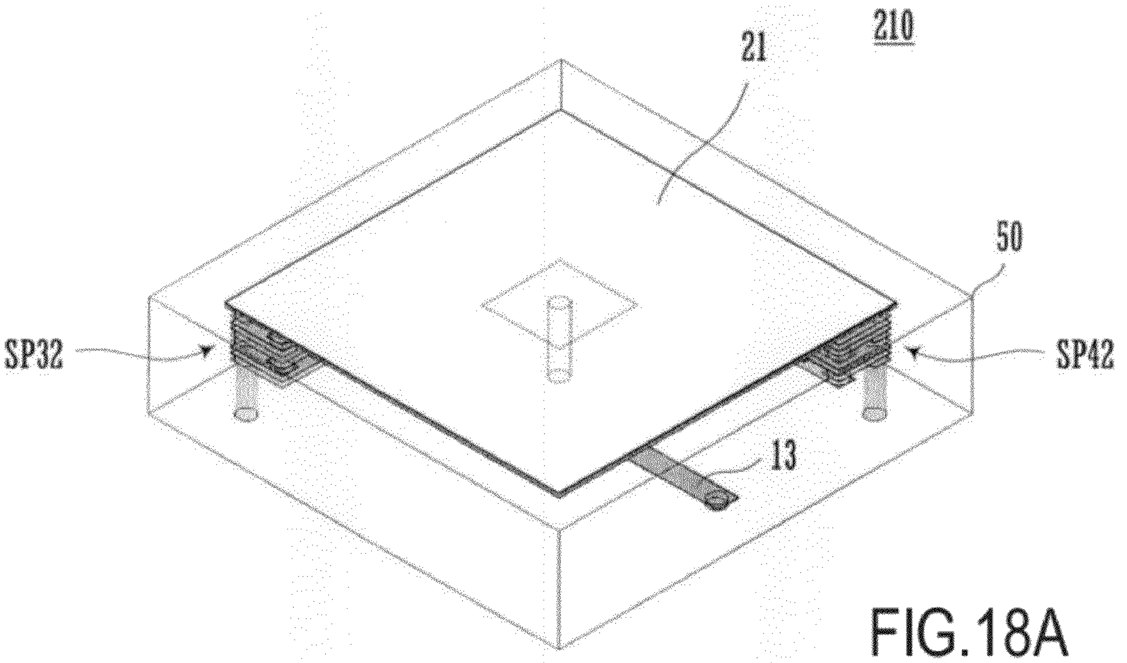
FIG. 18A is a perspective view of a signal transmission communication unit according to a seventh exemplary embodiment.
Figure 18B:
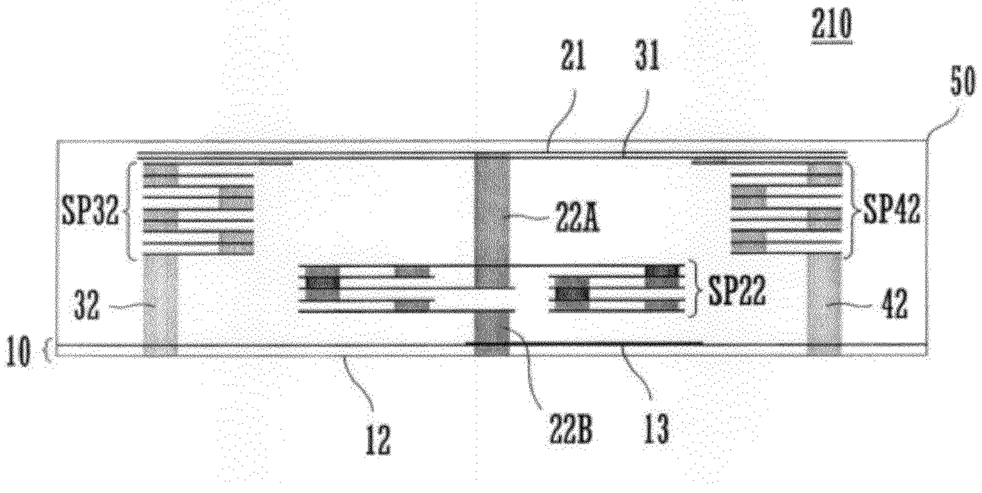
FIG. 18B is a perspective diagram viewed from the near side in the direction of FIG. 18A.

FIG. 18A is a perspective view of a signal transmission communication unit 210 according to a seventh exemplary embodiment. FIG. 18B is a perspective diagram viewed from the near side in the direction of FIG. 18A.

The signal transmission communication unit 210 according to the seventh exemplary embodiment is formed of a multi-layer board 50 including a plurality of dielectric layers and a plurality of conductive layers. A ground electrode 12 is formed on the lower surface of the multi-layer board 50. A signal transmission line 13 is formed inside the multi-layer board 50.

A coupling planar conductor 21 having a rectangular plate shape is formed inside the multi-layer board 50. A column-shaped conductor 22A whose first end portion is in contact with substantially the center of the coupling planar conductor 21 and a column-shaped conductor 22B whose first end portion is electrically connected to the signal transmission line 13 are also formed inside the multi-layer board 50. A spiral inductor SP22 is formed between a second end portion of the column-shaped conductor 22A and a second end portion of the column-shaped conductor 22B. With conductive layers parallel to the base component 10 and via holes perpendicular to the base component 10, the spiral inductor SP22 is arranged using a plurality of spiral conductive patterns twisting along the plane parallel to the base component 10.

A column-shaped conductor 32 whose first end portion is electrically connected to the ground electrode 12 is formed inside the multi-layer board 50. A spiral inductor SP32 is formed between a second end portion of the column-shaped conductor 32 and a planar conductor 31. With conductive layers parallel to the base component 10 and via holes perpendicular to the base component 10, the spiral inductor SP32 is arranged using spiral conductive patterns twisting along the plane parallel to the base component 10.

Similarly, a column-shaped conductor 42 whose first end portion is electrically connected to the ground electrode 12 is formed inside the multi-layer board 50. A spiral inductor SP42 is formed between a second end portion of the column-shaped conductor 42 and the planar conductor 31. With conductive layers parallel to the base component 10 and via holes perpendicular to the base component 10, the spiral inductor SP42 is arranged using spiral conductive patterns twisting along the plane parallel to the base component 10.

The size of the multi-layer board 50 is, for example, 4.0 mm×4.0 mm×1.0 mm. The relative dielectric constant is, for example, 6.0.

As described above, the signal transmission communication unit 210 is implemented by arranging the base component 10, the coupling planar conductor 21, the inductor circuit, and the LC-series circuit, inside the multi-layer board 50. The equivalent circuit of the signal transmission communication unit 210 is similar to the equivalent circuit shown in the sixth exemplary embodiment.

According to the seventh exemplary embodiment, since inductors are implemented by spiral conductive patterns, the inductance component per unit volume increases. Thus, the thickness of the whole signal transmission communication unit 210 can be reduced. In addition, with a wavelength shortening effect due to the dielectric constant of the multi-layer board 50, the area of the signal transmission communication unit 210 can be reduced. Furthermore, since fabrication using a multi-layer board method can be used, mass manufacturing can be easily achieved.

Figure 19:
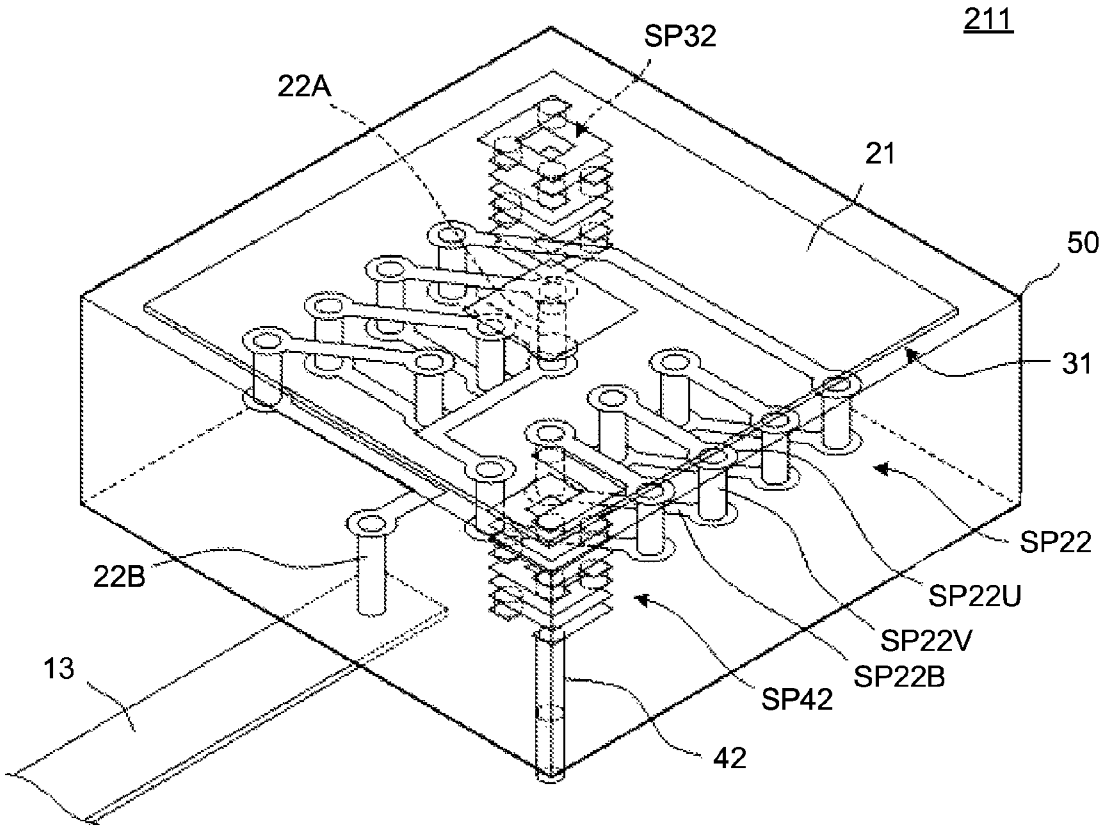
FIG. 19 is a perspective view of a signal transmission communication unit according to an eighth exemplary embodiment.

FIG. 19 is a perspective view of a signal transmission communication unit 211 according to an eighth exemplary embodiment. In the eighth exemplary embodiment, the signal transmission communication unit 211 is formed of a multi-layer board 50 including a plurality of dielectric layers and a plurality of conductive layers.

In the eighth exemplary embodiment, an inductor circuit, which is connected between a coupling planar conductor 21 and a signal transmission line 13, includes a spiral inductor SP22 twisting along the plane perpendicular to a face of a base component (lower surface of the multi-layer board 50). The spiral inductor SP22 includes a plurality of linear lower conductors SP22B, a plurality of linear upper conductors SP22U, and a plurality of via holes SP22V. Namely, an inductor that includes spiral conductors is arranged by sequentially connecting end portions of the linear lower conductors SP22B and end portions of the linear upper conductors SP22U through via the holes SP22V.

A column-shaped conductor 22B is formed between the signal transmission line 13 and the spiral inductor SP22. A column-shaped conductor 22A is formed between the spiral inductor SP22 and the coupling planar conductor 21. An inductor circuit between the coupling planar conductor 21 and the signal transmission line 13 is implemented by the column-shaped conductors 22A and 22B and the spiral inductor SP22.

A column-shaped conductor 42 whose first end portion is electrically connected to a ground electrode is formed inside the multi-layer board 50. A spiral inductor SP42 is formed between a second end portion of the column-shaped conductor 42 and the planar conductor 31. With conductive layers parallel to the base component and via holes perpendicular to the base component, spiral conductive patterns twisting along the plane parallel to the base component are arranged by the spiral inductor SP42.

Similarly, a column-shaped conductor whose first end portion is electrically connected to the ground electrode is formed inside the multi-layer board 50. A spiral inductor SP32 is formed between a second end portion of the column-shaped conductor and the planar conductor 31. With conductive layers parallel to the base component and via holes perpendicular to the base component, spiral conductive patterns twisting along the plane parallel to the base component are arranged by the spiral inductor SP32.

The spiral inductors SP32 and SP42 are similar to the spiral inductors shown in the seventh exemplary embodiment.

As described above, part of the inductor circuit connected between the coupling planar conductor 21 and the signal transmission line 13 is arranged using the spiral inductor SP22 twisting along the plane perpendicular to a face of the base component. Similarly, all or part of an inductor of an LC-series circuit connected between part of the coupling planar conductor 21 and the ground electrode may be arranged using a spiral inductor twisting along the plane perpendicular to a face of the base component.

The configurations of a signal transmission communication unit and a coupler according to a ninth exemplary embodiment will now be explained with reference to FIG. 20.

Figure 20A:
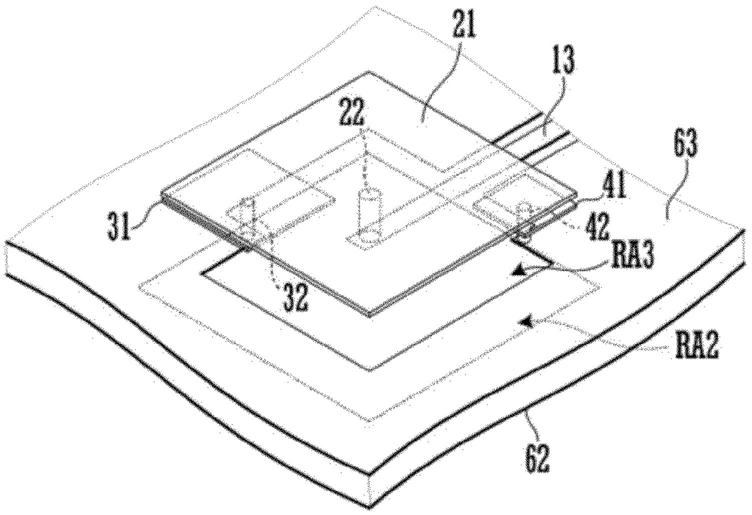
FIG. 20A is a perspective view of a signal transmission communication unit according to a ninth exemplary embodiment.
Figure 20B:
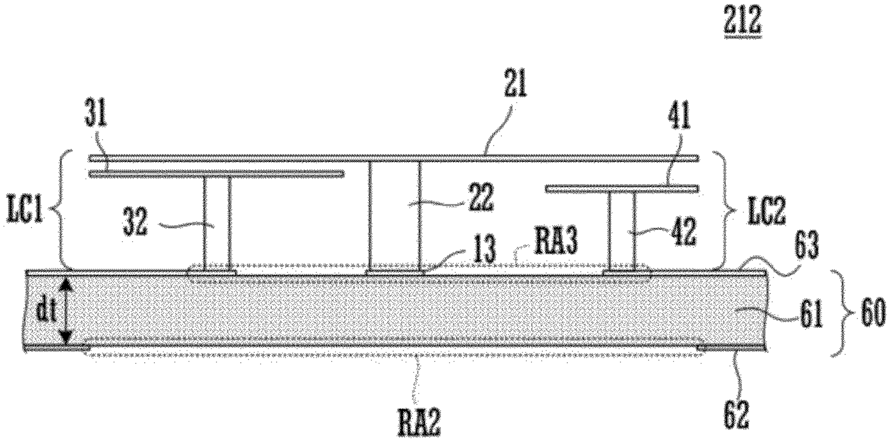
FIG. 20B is a sectional view of a principal portion of the signal transmission communication unit shown in FIG. 20A.

FIG. 20A is a perspective view of a signal transmission communication unit 212 and FIG. 20B is a sectional view of a principal portion of the signal transmission communication unit 212. The signal transmission communication unit 212 includes a mount board 60.

The mount board 60 includes a base material 61, a lower ground electrode 62 formed on the lower surface of the base material 61, an upper ground electrode 63 formed on the upper surface of the base material 61, and a signal transmission line 13 formed on the upper surface of the base material 61. A lower ground electrode opening portion RA2 having a square shape is formed on the lower ground electrode 62. An upper ground electrode opening portion RA3 having a roughly square shape is formed on the upper ground electrode 63.

The signal transmission line 13 extends further outward with respect to the upper ground electrode opening portion RA3. A grounded coplanar line is arranged using the signal transmission line 13, the upper ground electrode 63, and the lower ground electrode 62.

The signal transmission communication unit 212 includes a coupling planar conductor 21, which is parallel to the mount board 60 and has a rectangular plate shape. A column-shaped conductor 22 connecting the coupling planar conductor 21 and the signal transmission line 13 is arranged between the coupling planar conductor 21 and the mount board 60. An inductor circuit is implemented by the column-shaped conductor 22.

LC-series circuits LC1 and LC2, which are connected between part of the coupling planar conductor 21 and the upper ground electrode 63, are arranged between the coupling planar conductor 21 and the mount board 60. Namely, planar conductors 31 and 41 each facing part of the coupling planar conductor 21 with a certain space therebetween and column-shaped conductors 32 and 42 connecting the planar conductors 31 and 41 and the ground electrode 12 are arranged.

The lower ground electrode opening portion RA2 and the upper ground electrode opening portion RA3 are each formed in a region facing the coupling planar conductor 21. In particular, in this example, the center of the lower ground electrode opening portion RA2 and the center of the upper ground electrode opening portion RA3 correspond to the central axis of the column-shaped conductor 22. That is, the lower ground electrode opening portion RA2, the upper ground electrode opening portion RA3, and the column-shaped conductor 22 have substantially a coaxial relationship with each other.

An equivalent circuit of the signal transmission communication unit 212 is the same as the equivalent circuit of the signal transmission communication unit 201 shown in the first exemplary embodiment (see FIG. 4).

A coupler is implemented by arranging two signal transmission communication units 212 shown in FIG. 20 in such a manner that the coupling planar conductors 21 are opposed to (face) each other.

As described above, since the coupling planar conductor 21 faces the lower ground electrode opening portion RA2, a parasitic capacitance generated between the coupling planar conductor 21 and the lower ground electrode 62 is reduced. Therefore, a variation in the characteristics of the signal transmission communication unit and a variation in the characteristics of the coupler with respect to a change in the thickness dt of the mount board 60 can be suppressed. That is, even when various mount boards having different dielectric constants and different thicknesses are used, stable characteristics can be achieved.

The configurations and characteristics of a signal transmission communication unit and a coupler according to a tenth exemplary embodiment will be explained with reference to FIGS. 21 to 24.

Figure 21A:
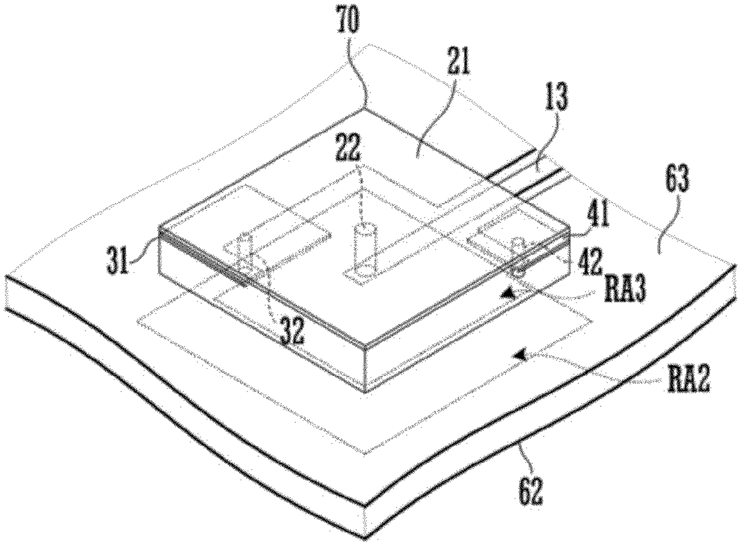
FIG. 21A is a perspective view of a signal transmission communication unit according to a tenth exemplary embodiment.
Figure 21B:
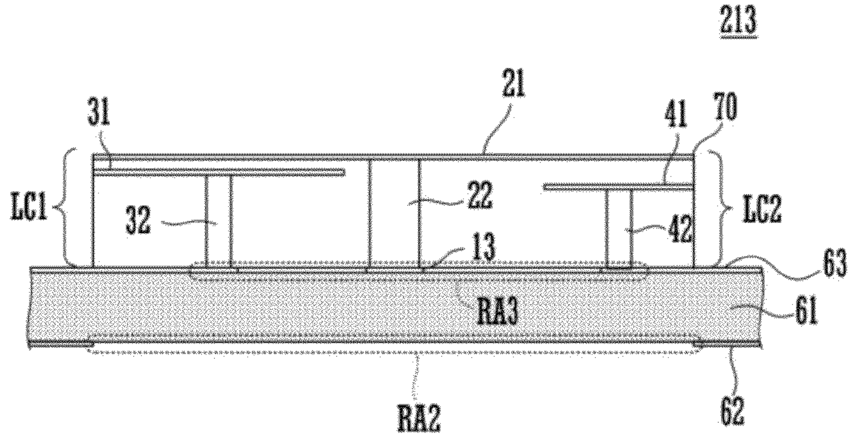
FIG. 21B is a sectional view of a principal portion of the signal transmission communication unit shown in FIG. 21A.

FIG. 21A is a perspective view of a signal transmission communication unit 213. FIG. 21B is a sectional view of a principal portion of the signal transmission communication unit 213. The signal transmission communication unit 213 includes a module 70 formed of a multi-layer board and a mount board 60 on which the module 70 is mounted.

Unlike the signal transmission communication unit 212 shown in FIG. 20 in the ninth exemplary embodiment, a coupling planar conductor 21, an inductor circuit, and an LC-series circuit are arranged as the module 70. The module 70 is formed of a multi-layer board including a plurality of dielectric layers and a plurality of conductive layers. The signal transmission communication unit 212 according to the ninth exemplary embodiment and the signal transmission communication unit 213 according to the tenth exemplary embodiment are electrically equivalent to each other.

Figure 22A:
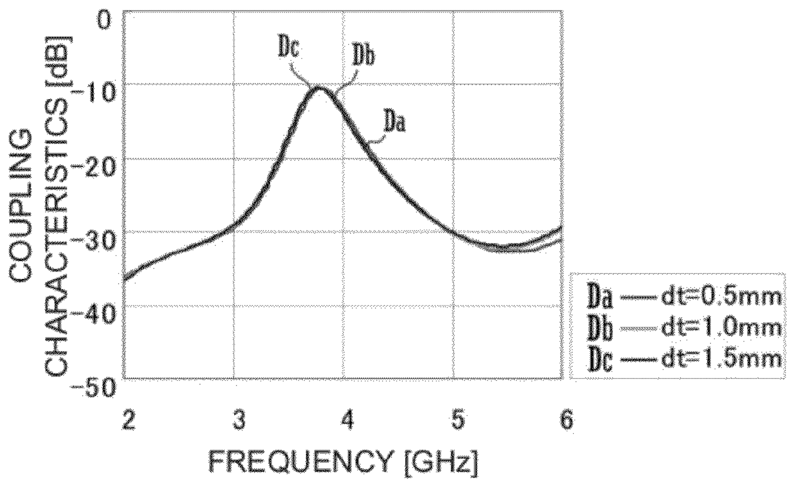
FIG. 22A is a graph showing the frequency characteristics of transmission characteristics of a coupler including the signal transmission communication unit according to the tenth exemplary embodiment.
Figure 22B:
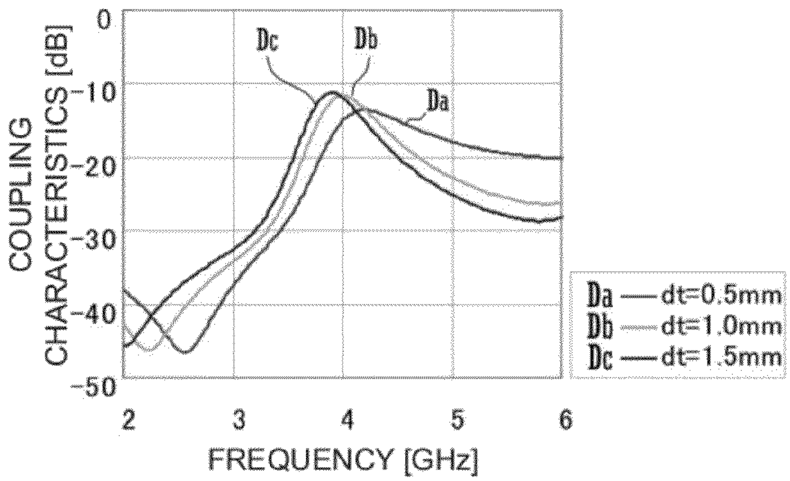
FIG. 22B is a graph showing the frequency characteristics of transmission characteristics of the coupler shown in FIG. 5.

Specific examples of dimensions of the components shown in FIG. 21 are provided below:

[Coupling Planar Conductor 21]
12 mm×12 mm
[Planar Conductor 31]
5.0 mm×5.0 mm
[Planar Conductor 41]
2.5 mm×2.5 mm
[Column-Shaped Conductor 22]
2.1 mm in height
[Column-Shaped Conductor 32]
1.8 mm in height
[Column-Shaped Conductor 42]
1.5 mm in height
[Mount Board 60]
0.5 mm to 1.5 mm in thickness
[Lower Ground Electrode Opening Portion RA2]
14 mm×14 mm
[Outline of Upper Ground Electrode Opening Portion RA3]
12 mm×12 mm FIG. 22A is a graph showing the frequency characteristics of transmission characteristics (S21 of an S parameter) of a coupler including the signal transmission communication unit according to the tenth exemplary embodiment. FIG. 22B is a graph showing the frequency characteristics of transmission characteristics (S21 of an S parameter) of the coupler 301 shown in FIG. 5. FIG. 22B shows a comparative example. In each graph, the thickness dt of the mount board 60 serves as a parameter.

In a case where no ground opening portion is formed in a region facing a coupling planar conductor, when the thickness dt of the mount board 60 varies in a range between 0.5 mm and 1.5 mm, the transmission characteristics (S21) change markedly, as shown in FIG. 22B. In contrast, according to the ninth exemplary embodiment, the transmission characteristics (S21) negligibly change, as shown in FIG. 22A.

The relationship between the sizes of the lower ground electrode opening portion RA2 and the upper ground electrode opening portion RA3 in the mount board and the transmission characteristics will be explained with reference to FIGS. 23 and 24.

Figure 23A:
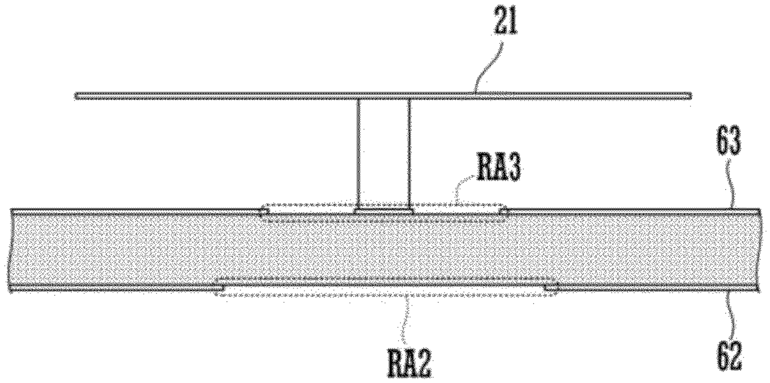
FIGS. 23A to 23C show sectional views of principal portions of three signal transmission communication units having different relationships between the size of a lower ground electrode opening portion RA2 and an upper ground electrode opening portion RA3 of a mount board.
Figure 23B:
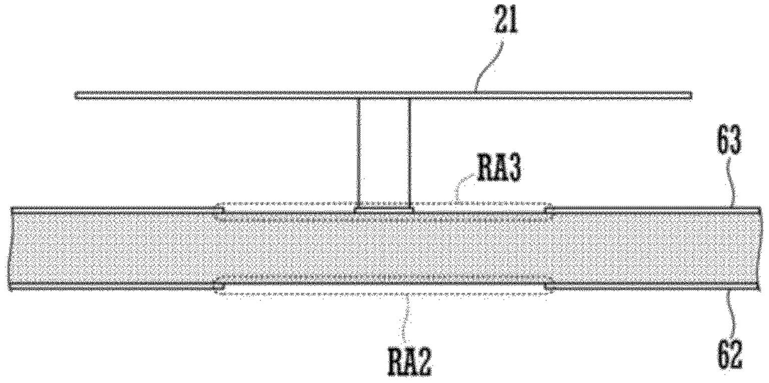
Figure 23C:
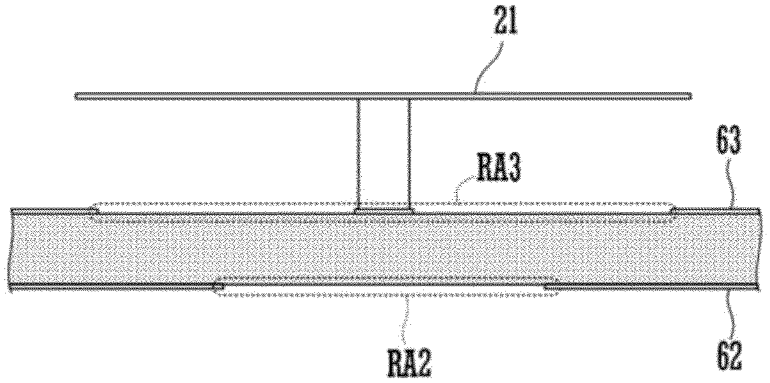

When two or more layers of ground are formed in the mount board, effects of suppression in a variation in the stray capacitance described above are different depending on the size of opening portions of ground layers. When the size of the upper ground electrode opening portion RA3 is smaller than the size of the lower ground electrode opening portion RA2, as shown in FIG. 23A, a small stray capacitance is generated between the coupling planar conductor 21 and the lower ground electrode 62. Also, when the size of the lower ground electrode opening portion RA2 is the same as the size of the upper ground electrode opening portion RA3, as shown in FIG. 23B, a small stray capacitance is generated between the coupling planar conductor 21 and the lower ground electrode 62. However, when the size of the upper ground electrode opening portion RA3 is larger than the size of the lower ground electrode opening portion RA2, as shown in FIG. 23C, a large stray capacitance is generated between the coupling planar conductor 21 and the lower ground electrode 62.

As described above, in a case where two or more ground electrode layers are mounted in the mount board, the size of the upper ground electrode opening portion RA3, which is close to the coupling planar conductor 21, is set to the minimum of the sizes of all the ground electrode opening portions. Due to this configuration, with the upper ground electrode 63, a parasitic capacitance generated between the coupling planar conductor 21 and the lower ground electrode 62 can be suppressed.

Figure 24A:
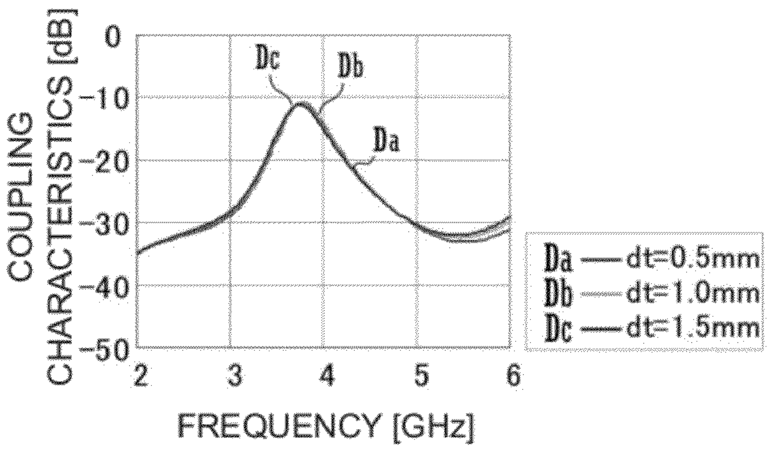
FIG. 24A shows the frequency characteristics of transmission characteristics (S21) of a coupler including the signal transmission communication unit shown in FIG. 23A.
Figure 24B:
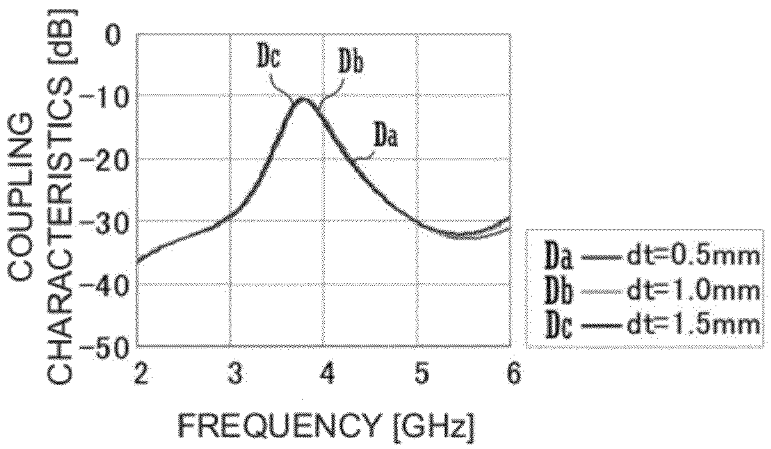
FIG. 24B shows the frequency characteristics of transmission characteristics (S21) of a coupler including the signal transmission communication unit shown in FIG. 23B.
Figure 24C:
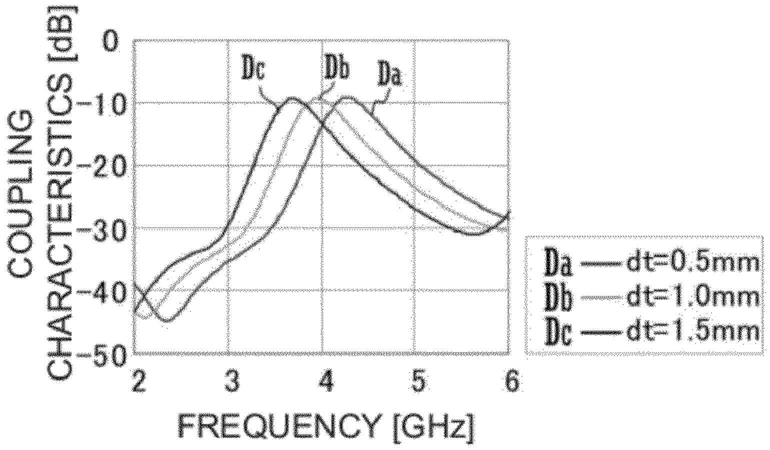
FIG. 24C shows the frequency characteristics of transmission characteristics (S21) of a coupler including the signal transmission communication unit shown in FIG. 23C.

FIG. 24A shows the frequency characteristics of transmission characteristics (S21) of a coupler including the signal transmission communication unit shown in FIG. 23A. FIG. 24B shows the frequency characteristics of transmission characteristics (S21) of a coupler including the signal transmission communication unit shown in FIG. 23B. Similarly, FIG. 24C shows the frequency characteristics of transmission characteristics (S21) of a coupler including the signal transmission communication unit shown in FIG. 23C.

As described above, with the configuration shown in FIG. 23A or FIG. 23B, a parasitic capacitance between the coupling planar conductor 21 and the lower ground electrode 62 is suppressed by the upper ground electrode 63. Thus, a variation in the characteristics with respect to a variation in the thickness of the board can be suppressed.

In the example shown above, the mount board 60 includes two ground electrode layers. When three or more ground electrode layers exist, the size of the opening of the ground electrode closest to the coupling planar conductor 21 is set to the minimum of the sizes of all the ground electrode opening portions. With this configuration, a parasitic capacitance generated between the coupling planar conductor 21 and the lower ground electrode 62 is suppressed by the ground electrode closest to the coupling planar conductor 21.

A signal transmission communication unit and a coupler according to an eleventh exemplary embodiment will now be explained with reference to FIG. 25.

Figure 25A:
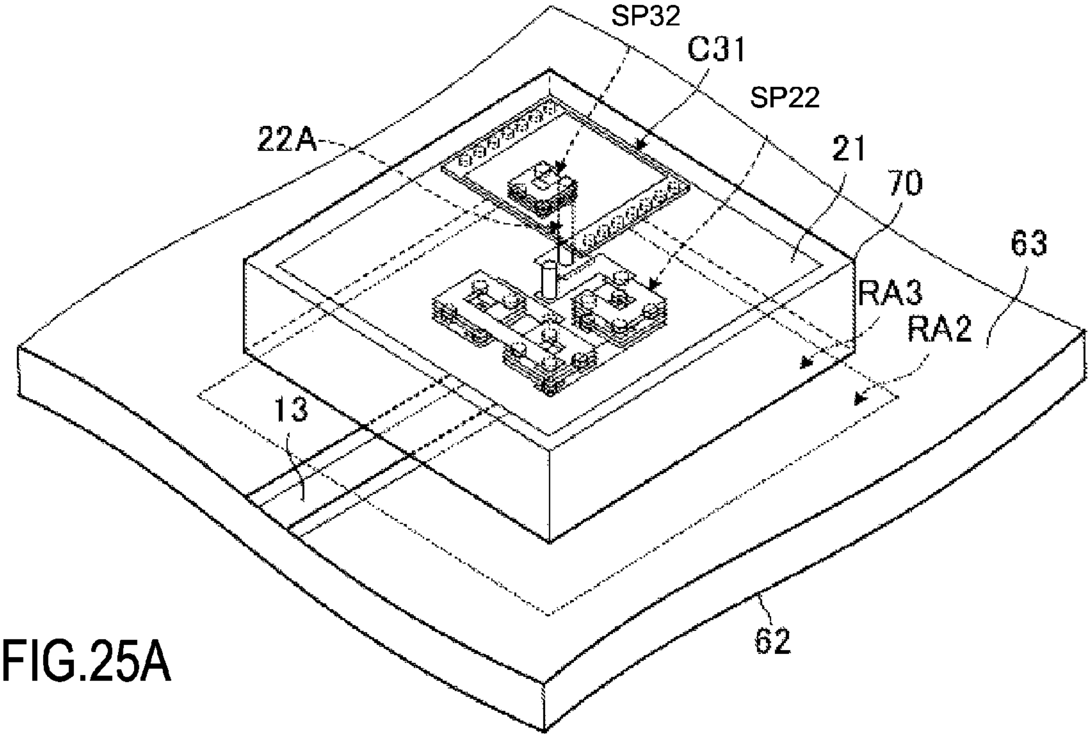
FIG. 25A is a perspective view of a signal transmission communication unit.
Figure 25B:
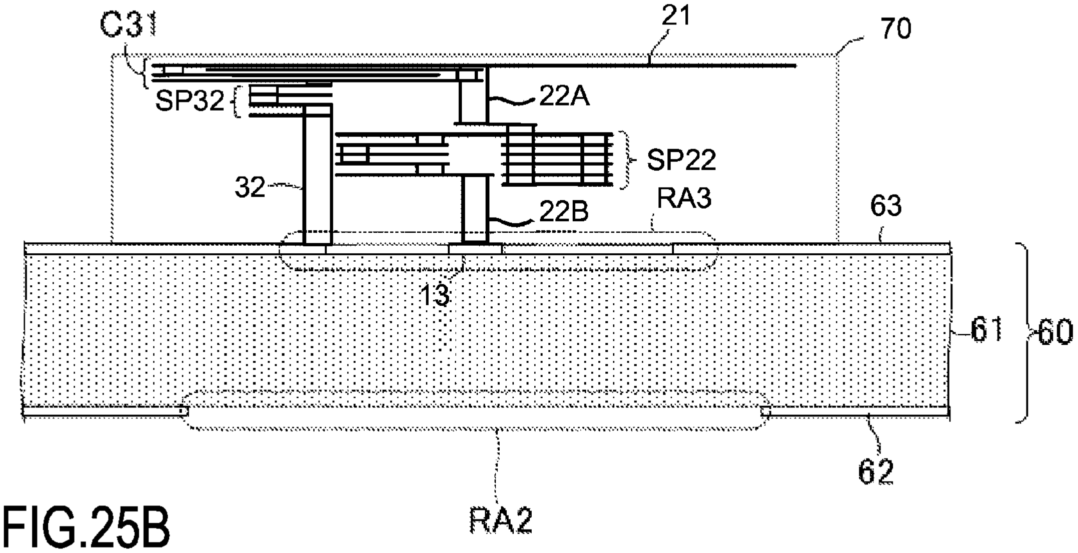
FIG. 25B is a perspective diagram obtained when

FIG. 25A is a perspective view of a signal transmission communication unit 214. FIG. 25B is a perspective diagram obtained when FIG. 25A is viewed in the direction of a signal transmission line 13. The signal transmission communication unit 214 includes a module 70, which is formed of a multi-layer board, and a mount board 60 on which the module 70 is mounted.

The signal transmission communication unit 214 differs from the signal transmission communication unit 213 shown in FIG. 21 in the tenth exemplary embodiment in the configuration of the module 70. A coupling planar conductor 21 having a rectangular plate shape is formed inside the module 70, which is formed of the multi-layer board. A column-shaped conductor 22A whose first end portion is in contact with substantially the center of the coupling planar conductor 21 and a column-shaped conductor 22B whose first end portion is electrically connected to the signal transmission line 13 are also formed inside the module 70. A spiral inductor SP22 is formed between a second end portion of the column-shaped conductor 22A and a second end portion of the column-shaped conductor 22B. With conductive layers parallel to the mount board 60 and via holes perpendicular to the mount board 60, the spiral inductor SP22 is arranged using a plurality of spiral conductive patterns twisting along the plane parallel to the mount board 60.

A multi-layer capacitor C31 including part of the coupling planar conductor 21 is arranged inside the module 70. A column-shaped conductor 32 whose first end portion is electrically connected to an upper ground electrode 63 of the mount board is formed inside the module 70. A spiral inductor SP32 is formed between a second end portion of the column-shaped conductor 32 and the multi-layer capacitor C31. With conductive layers parallel to the mount board 60 and via holes perpendicular to the mount board 60, the spiral inductor SP32 is arranged using spiral conductive patterns twisting along the plane parallel to the mount board 60.

As described above, the signal transmission communication unit 214 is arranged using the module 70 in which the coupling planar conductor 21, the inductor circuit, and the LC-series circuit are arranged, and the mount board 60. A coupler is implemented by arranging two signal transmission communication units 214 in such a manner that the coupling planar conductors 21 are opposed to (face) each other.

The equivalent circuit of the coupler is similar to the equivalent circuit shown in FIG. 9 in the third exemplary embodiment.

The size of an upper ground electrode opening portion RA3 of the mount board 60 is substantially the same as the size of the bottom face of the module 70. The size of the upper ground electrode opening portion RA3 is smaller than the size of a lower ground electrode opening portion RA2. Thus, a parasitic capacitance generated between the coupling planar conductor 21 and the lower ground electrode 62 is reduced. Therefore, a variation in the characteristics of the signal transmission communication unit and a variation in the characteristics of the coupler with respect to a change in the thickness dt of the mount board 60 can be suppressed.

In each of the exemplary embodiments described above, an inductor portion of an LC-series circuit and an inductor circuit are each arranged using a column-shaped conductor, and a capacitor portion of the LC-series circuit is arranged using a planar conductor. However, at least one of the inductor circuit, the inductor portion of the LC-series circuit, and the capacitor portion of the LC-series circuit may be arranged using a chip component. In addition, the chip component may be mounted on the base component.

In the coupler shown in each of the exemplary embodiments described above, two signal transmission communication units having the same configuration are arranged as a pair. However, as long as a coupler is arranged in such a manner that capacitive coupling is achieved by planar conductors being opposed to (facing) each other in a non-contact state, a signal transmission communication unit according to this disclosure may be adopted to one of the signal transmission communication units.

According to the present disclosure, the effects described below are achieved:

(a) With a resonant frequency acquired in accordance with the sizes of a capacitance component and an inductance component of an LC-series circuit component, an attenuation pole can be arranged at a desired frequency of transmission/reception transmission characteristics. By setting an attenuation pole or attenuation poles at a frequency lower or higher or at frequencies lower and higher than a frequency range to be used for communication, desired pass band characteristics of a frequency used can be achieved.

(b) The base component, the coupling planar conductor, the inductor circuit, and the LC-series circuit are arranged in a multi-layer board including a plurality of dielectric layers and a plurality of conductive layers. Thus, fabrication using a general multi-layer board method can be easily achieved.

(c) There is no need to form a folded stub described in PTL 1 on a dielectric board. Thus, an area to be occupied can be reduced.

(d) Since a ground electrode of the mount board includes an opening portion in a region facing the coupling planar conductor, a parasitic capacitance generated between the coupling planar conductor and the ground electrode is reduced. Thus, a variation in the characteristics according to differences in the thickness and the dielectric constant of the mount board can be suppressed.

(e) In particular, when two or more layers each include a ground electrode and the size of the opening portion of the ground electrode closest to the coupling planar conductor is the minimum of the sizes of the opening portions of all the ground electrodes, a variation in the characteristics according to differences in the thickness and the dielectric constant of the mount board can be reduced more effectively.

(f) A capacitor of the LC-series circuit includes a planar conductor facing in parallel to the coupling planar conductor, the planar conductor is formed in rotationally symmetrical to the center of the coupling planar conductor, and the inductor circuit is arranged at a position symmetrical to the center of the planar conductor. Thus, a variation in the characteristics with respect to a positional shift in an in-plane direction in a state where coupling planar conductors of two signal transmission communication units face each other can be suppressed.

(g) The inductor circuit component or the LC-series circuit component includes a spiral conductor. Thus, the inductance component per unit volume increases, the position of the coupling planar conductor can be lowered, and the thickness of the communication unit can be reduced. In addition, an inductance component for forming an attenuation pole can be set in a wider range within a unit volume.

(h) The LC-series circuit component includes a plurality of planar conductors. Thus, the capacitance component per unit volume increases, the position of the coupling planar conductor can be lowered, and the thickness of the communication unit can be reduced. In addition, a capacitance component for forming an attenuation pole can be set in a wider range within a unit volume.

While exemplary embodiments have been described above, it is to be understood that variations and modifications will be apparent to those skilled in the art without departing from the scope and spirit of the disclosure.

What is claimed is:

1. A signal transmission communication unit comprising:

a base component including a signal transmission line and a ground electrode;

a coupling planar conductor parallel to the base component and having a planar shape;

an inductor circuit connected between the coupling planar conductor and the signal transmission line; and an LC-series circuit connected between part of the coupling planar conductor and the ground electrode and including a capacitor and an inductor connected in series, wherein the inductor circuit is arranged between the coupling planar conductor and the base component, the LC-series circuit is arranged between the coupling planar conductor and the base component, the capacitor includes first and second facing conductors, the first facing conductor being a portion of the coupling planar conductor, and inductor is connected between the second facing conductor and the ground electrode.

2. The signal transmission communication unit according to claim 1, wherein the base component, the coupling planar conductor, the inductor circuit, and the LC-series circuit are in a multi-layer board including a plurality of dielectric layers and a plurality of conductive layers.

3. The signal transmission communication unit according to claim 1, wherein the base component is a mount board on which the coupling planar conductor, the inductor circuit, and the LC-series circuit are mounted, and a ground electrode including an opening portion arranged in a region facing the coupling planar conductor is in the mount board.

4. The signal transmission communication unit according to claim 3, wherein the coupling planar conductor, the inductor circuit, and the LC-series circuit are arranged as a module.

5. The signal transmission communication unit according to claim 3, wherein two or more layers each include the ground electrode, and the size of the opening portion of the ground electrode that is closest to the coupling planar conductor is a minimum of the sizes of the opening portions of all the ground electrodes.

6. The signal transmission communication unit according to claim 4, wherein two or more layers each include the ground electrode, and the size of the opening portion of the ground electrode that is closest to the coupling planar conductor is a minimum of the sizes of the opening portions of all the ground electrodes.

7. The signal transmission communication unit according to claim 1, wherein the capacitor of the LC-series circuit includes a planar conductor facing in parallel to the coupling planar conductor, the planar conductor is rotationally symmetrical to the center of the coupling planar conductor, and the inductor circuit is positioned symmetrical to the center of the planar conductor.

8. The signal transmission communication unit according to claim 2, wherein the capacitor of the LC-series circuit includes a planar conductor facing in parallel to the coupling planar conductor, the planar conductor is rotationally symmetrical to the center of the coupling planar conductor, and the inductor circuit is positioned symmetrical to the center of the planar conductor.

9. The signal transmission communication unit according to claim 3, wherein the capacitor of the LC-series circuit includes a planar conductor facing in parallel to the coupling planar conductor, the planar conductor is rotationally symmetrical to the center of the coupling planar conductor, and the inductor circuit is positioned symmetrical to the center of the planar conductor.

10. The signal transmission communication unit according to claim 1, wherein the inductor circuit includes a spiral conductor twisting along a plane parallel or perpendicular to the base component.

11. The signal transmission communication unit according to claim 1, wherein the inductor of the LC-series circuit includes a spiral conductor twisting along a plane parallel or perpendicular to the base component.

12. The signal transmission communication unit according to claim 1, wherein the capacitor of the LC-series circuit includes a plurality of planar conductors that extend in a plane shape parallel to the base component and that generate capacitances in portions where the planar conductors face each other.

13. The signal transmission communication unit according to claim 1, wherein at least one of the inductor circuit and the LC-series circuit is arranged using a chip component mounted on the base component.

14. A coupler including at least one signal transmission communication unit according to claim 1 on each of a transmitter side and a receiver side, wherein the coupling planar conductors face each other in a non-contact state.

15. A coupler including at least one signal transmission communication unit according to claim 2 on each of a transmitter side and a receiver side, wherein the coupling planar conductors face each other in a non-contact state.

16. A coupler including at least one signal transmission communication unit according to claim 3 on each of a transmitter side and a receiver side, wherein the coupling planar conductors face each other in a non-contact state.

17. A coupler including at least one signal transmission communication unit according to claim 7 on each of a transmitter side and a receiver side, wherein the coupling planar conductors face each other in a non-contact state.

18. A coupler including at least one signal transmission communication unit according to claim 8 on each of a transmitter side and a receiver side, wherein the coupling planar conductors face each other in a non-contact state.

19. A coupler including at least one signal transmission communication unit according to claim 9 on each of a transmitter side and a receiver side, wherein the coupling planar conductors face each other in a non-contact state.

20. A coupler including at least one signal transmission communication unit according to claim 10 on each of a transmitter side and a receiver side, wherein the coupling planar conductors face each other in a non-contact state.

21. The signal transmission communication unit according to claim 1, wherein the inductor circuit is connected in series between the signal transmission line and the coupling planar conductor.

* * * * *